(12) United States Patent
Suzuki et al.

(10) Patent No.: US 10,662,885 B2
(45) Date of Patent: May 26, 2020

(54) CONTROL DEVICE FOR INTERNAL COMBUSTION ENGINE

(71) Applicant: TOYOTA JIDOSHA KABUSHIKI KAISHA, Aichi-ken (JP)

(72) Inventors: Yusuke Suzuki, Hadano (JP); Kunihiko Usui, Fuji (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/224,696

(22) Filed: Dec. 18, 2018

(65) Prior Publication Data
US 2019/0249614 A1   Aug. 15, 2019

(30) Foreign Application Priority Data

Feb. 14, 2018 (JP) ................................ 2018-024162

(51) Int. Cl.
| F02D 41/12 | (2006.01) |
|---|---|
| F02D 41/06 | (2006.01) |
| F02D 31/00 | (2006.01) |
| F02D 41/30 | (2006.01) |
| F02D 41/08 | (2006.01) |

(Continued)

(52) U.S. Cl.
CPC .......... *F02D 41/062* (2013.01); *F02D 11/105* (2013.01); *F02D 31/007* (2013.01); *F02D 41/0002* (2013.01); *F02D 41/042* (2013.01); *F02D 41/065* (2013.01); *F02D 41/08* (2013.01); *F02D 41/123* (2013.01); *F02D 41/18* (2013.01); *F02D 41/3082* (2013.01); *F02N 99/006* (2013.01); *F02P 5/045* (2013.01); *F02B 2075/125* (2013.01); *F02D 41/2461* (2013.01); *F02D 41/2464* (2013.01); *F02D 2041/389* (2013.01); *F02D 2200/0406* (2013.01);

(Continued)

(58) Field of Classification Search
CPC .. F02D 41/062; F02D 41/065; F02D 41/0002; F02D 41/123; F02D 41/18; F02D 41/042; F02D 41/08; F02D 41/3082; F02D 41/2461; F02D 41/2464; F02D 11/105; F02D 31/007; F02D 2200/703; F02D 2200/0406; F02D 2200/101; F02D 2041/389; F02P 5/045; F02N 99/006; F02N 11/0814; F02B 2075/125
USPC ......... 701/103–105, 110, 112, 113; 123/399, 123/320, 325, 329, 332, 481, 443, 179.3, 123/179.4
See application file for complete search history.

(56) References Cited

FOREIGN PATENT DOCUMENTS

JP       5305619 B2    10/2013

*Primary Examiner* — Hai H Huynh
(74) *Attorney, Agent, or Firm* — Hauptman Ham, LLP

(57) ABSTRACT

A control device for an internal combustion engine executes an automatic stop control and automatic start-up control for an intermittent operation of the internal combustion engine. In the automatic start-up control, the control device is configured to commence a restart by starting fuel injection from a fuel-injection-start cylinder. In the automatic stop control, the control device is configured to: execute an air-fuel-ratio rich processing that controls an air-fuel ratio such that the air-fuel ratio becomes richer than the stoichiometric air-fuel ratio before a start of the fuel cut; execute a throttle closing processing that closes a throttle valve in synchronization with the fuel cut; and execute a throttle opening processing approaches the atmospheric air pressure before a cylinder destined to be the fuel-injection-start cylinder later completes the last intake stroke in the course (Continued)

of the engine stop after execution of the throttle closing processing.

13 Claims, 9 Drawing Sheets

(51) Int. Cl.
*F02D 41/04* (2006.01)
*F02D 41/18* (2006.01)
*F02N 99/00* (2010.01)
*F02D 11/10* (2006.01)
*F02D 41/00* (2006.01)
*F02P 5/04* (2006.01)
*F02D 41/38* (2006.01)
*F02B 75/12* (2006.01)
*F02D 41/24* (2006.01)
*F02N 11/08* (2006.01)

(52) U.S. Cl.
CPC .. *F02D 2200/101* (2013.01); *F02D 2200/703* (2013.01); *F02N 11/0814* (2013.01)

CONTROL DEVICE FOR INTERNAL COMBUSTION ENGINE

CROSS-REFERENCE TO RELATED APPLICATION

This application is based on and claims the benefit of Japanese Patent Application No. 2018-24162, filed on Feb. 14, 2018, which is incorporated by reference herein in its entirety.

BACKGROUND

Technical Field

The present disclosure relates to a control device for an internal combustion engine, and more particularly to a control device for controlling an internal combustion engine such that a restart thereof is started by starting fuel injection from a fuel-injection-start cylinder that is a cylinder stopping in an expansion stroke or a cylinder stopping in a compression stroke during an intermittent stop of the internal combustion engine.

Background Art

For example, JP 5305619 B discloses an engine control device for a hybrid vehicle capable of using an internal combustion engine and an electric motor (motor generator) as its power source. According to this engine control device, the following engine stop control is executed when the internal combustion engine is stopped during a vehicle running performed by the use of both torques of the internal combustion engine and the electric motor.

According to the engine stop control described above, after the engine speed decreases to a throttle-opening-allowance engine speed in the course of the engine stopping after a fuel cut, a throttle valve is opened. More specifically, in order to stably maintaining an intake manifold pressure at the atmospheric air pressure immediately after an engine stop (engine rotation stop), this opening of the throttle valve is performed not after completion of the engine stop but in the course of the engine stopping as just described.

Moreover, in order to prevent the atmosphere of a catalyst arranged in an exhaust gas passage from being made lean (i.e., oxygen excess), the opening of the throttle valve is performed not immediately after the start of the fuel cut but after the engine speed is reached to the throttle-opening-allowance engine speed. It should be noted that this throttle-opening-allowance engine speed corresponds to an engine speed at which, even if the throttle valve is fully open, a decrease of the reducing ability of the catalyst is not caused.

SUMMARY

In order to restart an internal combustion engine after an intermittent stop thereof, a restart control that starts the restart by injecting fuel early by the use of a fuel injection valve that can inject fuel directly into a cylinder (hereunder, referred to as an "early start-up control") is known. More specifically, according to this early start-up control, fuel injection is started from a "fuel-injection-start cylinder" that is a cylinder in which a piston is in an expansion stroke or a compression stroke during an engine stop.

In order to achieve a favorable startability in an example in which the early start-up control as described above is used, it is required to properly charge the air into the fuel-injection-start cylinder. The charging of the air into the fuel-injection-start cylinder is performed when a cylinder destined to be the fuel-injection-start cylinder later is in the last intake stroke in the course of the engine stopping after a fuel cut for the intermittent stop. Therefore, in order to properly charge the air into the fuel-injection-start cylinder, it is required to increase throttle-downstream pressure to about atmospheric pressure before the cylinder destined to be the fuel-injection-start cylinder later completes the last intake stroke. That is to say, in the example in which this early start-up control is used, it is required to increase the throttle-downstream pressure to about atmospheric pressure earlier, as compared to the technique disclosed in JP 5305619 B that controls the throttle valve in order to increase the intake manifold pressure (throttle-downstream pressure) to about atmospheric pressure immediately after an engine stop. In order to satisfy this kind of request, it is required to advance a timing of opening the throttle valve after the fuel cut (in other words, to increase a "throttle-opening engine speed").

On the other hand, the higher the engine speed at the start of a fuel cut for the intermittent stop (i.e., fuel-cut engine speed) is, the longer a time period in which the internal combustion engine rotates in the course of the engine stopping after the fuel cut becomes. If this time period becomes longer, the amount of the air (fresh air) that flows out toward a catalyst becomes greater. Thus, in order to reduce the phenomenon of making lean the atmosphere of the catalyst, it is required to cause the throttle-opening engine speed to be higher when the fuel-cut engine speed is higher.

As described above, a demand for the throttle-opening engine speed in terms of the air charging and a demand for the throttle-opening engine speed in terms of reducing the phenomenon of making lean the atmosphere of the catalyst are contradictory to each other. Thus, there is a concern that, when a high fuel-cut engine speed is used, it may become difficult to obtain the throttle-opening engine speed that can satisfy both the two demands described above. Also, this may lead to limiting the range of the fuel-cut engine speed that is available when the intermittent stop is performed.

The present disclosure has been made to address the problem described above, and an object of the present disclosure is to provide a control device for an internal combustion engine that can favorably achieve both a good startability by using a high throttle-downstream pressure and reduction of the phenomenon of making lean the atmosphere of a catalyst, in the internal combustion engine in which a restart thereof is performed by the use of the above-described early start-up control after an intermittent stop.

A control device for controlling an internal combustion engine according to the present disclosure is configured to control an internal combustion engine that includes:

a fuel injection valve configured to directly inject fuel into a cylinder;

an ignition device configured to ignite an air-fuel mixture of the fuel and air; and a throttle valve arranged in an intake air passage.

The control device is configured to:

execute an automatic stop control that performs a fuel cut during operation of a vehicle system on which the internal combustion engine is mounted to intermittently stop the internal combustion engine; and execute an automatic start-up control that performs a restart of the internal combustion engine that has been stopped by the automatic stop control.

The control device is configured, in the automatic start-up control, to commence the restart by starting fuel injection from a fuel-injection-start cylinder that is a cylinder in which a piston is in an expansion stroke or a compression stroke during an engine stop.

The control device is configured, in the automatic stop control, to:

execute an air-fuel-ratio rich processing that controls an air-fuel ratio such that the air-fuel ratio becomes richer than a stoichiometric air-fuel ratio before a start of the fuel cut;

execute a throttle closing processing that closes the throttle valve in synchronization with the fuel cut; and execute a throttle opening processing that opens the throttle valve such that a throttle-downstream pressure that is a pressure at a portion of the intake-air passage located on a downstream side of the throttle valve approaches an atmospheric air pressure before a cylinder destined to be the fuel-injection-start cylinder later completes a last intake stroke in a course of the engine stop after execution of the throttle closing processing.

The control device may be configured to execute a first correction processing that corrects a throttle-opening engine speed that is an engine speed at which the throttle valve starts to open by the throttle opening processing. Also, the control device may be configured, in the first correction processing, to correct the throttle-opening engine speed used for a next or subsequent automatic stop control, based on at least one of a specified throttle-downstream pressure and a specified exhaust air-fuel ratio, the specified throttle-downstream pressure being the throttle-downstream pressure present when the cylinder destined to be the fuel-injection-start cylinder later completes the last intake stroke in the course of the engine stop, the specified exhaust air-fuel ratio being an air-fuel ratio of exhaust gas present when the engine stop by the automatic stop control is completed.

The control device may be configured, in the first correction processing, to increase the throttle-opening engine speed when the specified throttle-downstream pressure is lower than a pressure threshold value.

The control device may be configured, in the first correction processing, to decrease the throttle-opening engine speed when the specified exhaust air-fuel ratio is higher than an air-fuel-ratio threshold value.

The control device may be configured, in the first correction processing, to increase a degree of enrichment of the air-fuel ratio by the air-fuel-ratio rich processing in addition to an increase of the throttle-opening engine speed when, if the throttle-opening engine speed is increased, the throttle-opening engine speed exceeds an upper limit value.

In the first correction processing, the control device may be configured, where the degree of enrichment is not able to be increased due to a limitation when, if the throttle-opening engine speed is increased, the throttle-opening engine speed exceeds the upper limit value, to decrease a fuel cut engine speed that is an engine speed at the start of the fuel cut, instead of an increase of the degree of enrichment, in addition to the increase of the throttle-opening engine speed.

In the first correction processing, the control device may be configured, when, if the throttle-opening engine speed is decreased, the throttle-opening engine speed falls below a lower limit value, to increase a degree of enrichment of the air-fuel ratio by the air-fuel-ratio rich processing without decreasing the throttle-opening engine speed.

In the first correction processing, the control device may be configured, where the degree of enrichment is not able to be increased due to a limitation when, if the throttle-opening engine speed is decreased, the throttle-opening engine speed falls below the lower limit value, to decrease a fuel cut engine speed that is an engine speed at the start of the fuel cut, instead of an increase of the degree of enrichment, without decreasing the throttle-opening engine speed.

The control device may be configured to execute a second correction processing that corrects a throttle-opening engine speed that is an engine speed at which the throttle valve starts to open by the throttle opening processing. Also, the control device may be configured, in the second correction processing, to correct the throttle-opening engine speed used for the course of the engine stop associated with execution of the fuel cut, based on a speed of the engine-speed drop after the start of the fuel cut.

The control device may be configured to retard a spark timing in synchronization with the air-fuel-ratio rich processing.

The control device may be configured, where an engine speed is higher than an engine speed threshold value when a request to execute the automatic stop control is made, to execute a fuel-cut engine-speed correction processing that performs the fuel cut after causing the engine speed to be lower than or equal to the engine speed threshold value.

The control device may be configured, when a fuel cut engine speed that is an engine speed at the start of the fuel cut is higher within a high fuel-cut engine-speed range in which the fuel cut engine speed is high, to lower a throttle-opening engine speed that is an engine speed at which the throttle valve starts to open by the throttle opening processing, as compared to when the fuel cut engine speed is lower in the high fuel-cut engine speed range.

The control device may be configured, in receiving a request to restart the internal combustion engine during the throttle valve being closed by the throttle closing processing in the course of the engine stop, to discontinue the automatic stop control and execute a second restart control that is different from the automatic start-up control. Also, in the second restart control, the control device may be configured, in the course of the engine stop after discontinuing the automatic stop control, to open the throttle valve and then restart the fuel injection.

According to the control device for an internal combustion engine of the present disclosure, the air-fuel-ratio rich processing is executed before the start of the fuel cut for an intermittent stop of the internal combustion engine. Also, the throttle closing processing is executed in synchronization with the fuel cut, and thereafter the throttle opening processing is executed in the course of the engine stop. According to the air-fuel-ratio rich processing, the air-fuel ratio of the atmosphere of a catalyst arranged in an exhaust gas passage can be enriched before the start of the fuel cut. By executing this kind of the air-fuel-ratio rich processing as well as the throttle closing processing, the air-fuel-ratio of the atmosphere of the catalyst can become easy to be maintained at a value near the stoichiometric air-fuel-ratio when the air whose oxygen concentration is high flows into the catalyst in response to the execution of the fuel cut. This can advance a timing of opening the throttle valve (i.e., increase the "throttle-opening engine speed") by the throttle opening processing while reducing the phenomenon of making lean the atmosphere of the catalyst. Therefore, with the automatic stop control according to the control device of the present disclosure, an intermittent operation of the internal combustion engine can be performed while favorably achieve both a good startability by using a high throttle-downstream pressure and reduction of the phenomenon of making lean the atmosphere of the catalyst, in a system using the early start-up control.

DETAILED DESCRIPTION

Figure 1:
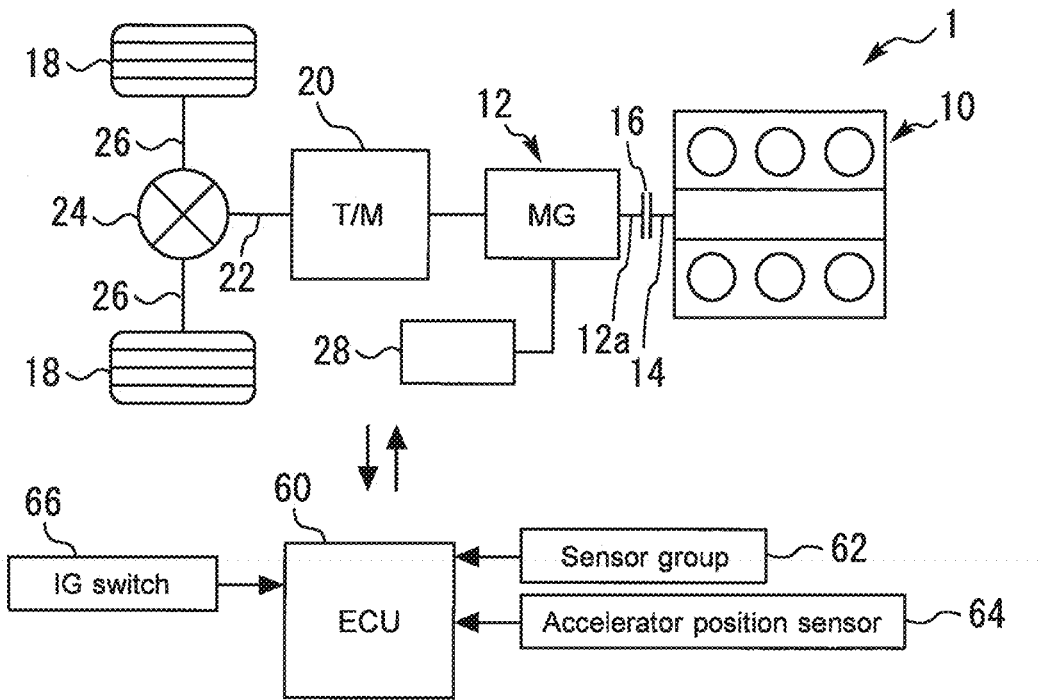
FIG. 1 is a schematic diagram for describing an example of the configuration of a vehicle system according to a first embodiment of the present disclosure.

In the following embodiments of the present disclosure, the same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiments are not necessarily essential to the present disclosure unless explicitly shown otherwise, or unless the present disclosure is explicitly specified by the structures, steps or the like theoretically.

First embodiment

Firstly, a first embodiment according to the present disclosure will be described with reference to FIGS. 1 to 8.

1-1. Example of Configuration of Vehicle System

FIG. 1 is a schematic diagram for describing an example of the configuration of a vehicle system according to the first embodiment of the present disclosure. The vehicle system shown in FIG. 1 is provided with a vehicle 1. The vehicle 1 is equipped with an internal combustion engine 10 and an electric motor 12 as its power source. That is to say, the vehicle 1 is a hybrid vehicle. As an example, the electric motor 12 is a motor generator (MG).

To be more specific, an output shaft (i.e., crankshaft) 14 of the internal combustion engine 10 is coupled to an output shaft 12a of the MG 12 via, for example, a hydraulic clutch 16. In a state of the internal combustion engine 10 and MG 12 being connected via the clutch 16, only the driving force of the internal combustion engine 10, or the resultant force of the driving force of the internal combustion engine 10 and the driving force of the MG 12 can be transmitted to drive wheels 18. Moreover, in a state of the clutch 16 being released, only the driving force of the MG 12 can be transmitted to the drive wheels 18.

An output shaft 12a of the MG 12 is connected to a transmission 20 via, for example, a torque converter (not shown). An output shaft 20a of the transmission 20 is connected to a propeller shaft 22. The propeller shaft 22 is connected to left and right drive shafts 26 via differential gears 24. The drive shafts 26 are connected to the respective drive wheels 18.

The MG 12 is electrically connected to a battery 28. The MG 12 has a function as an electric power generator that converts, into an electric power, the torque of the crankshaft 14 that is generated by combustion. An electric power generated by the MG 12 is stored in the battery 28. In addition, the MG 12 also has a function as an electric motor that rotates to drive the crankshaft 14 by the use of the electric power of the battery 28.

Figure 2:
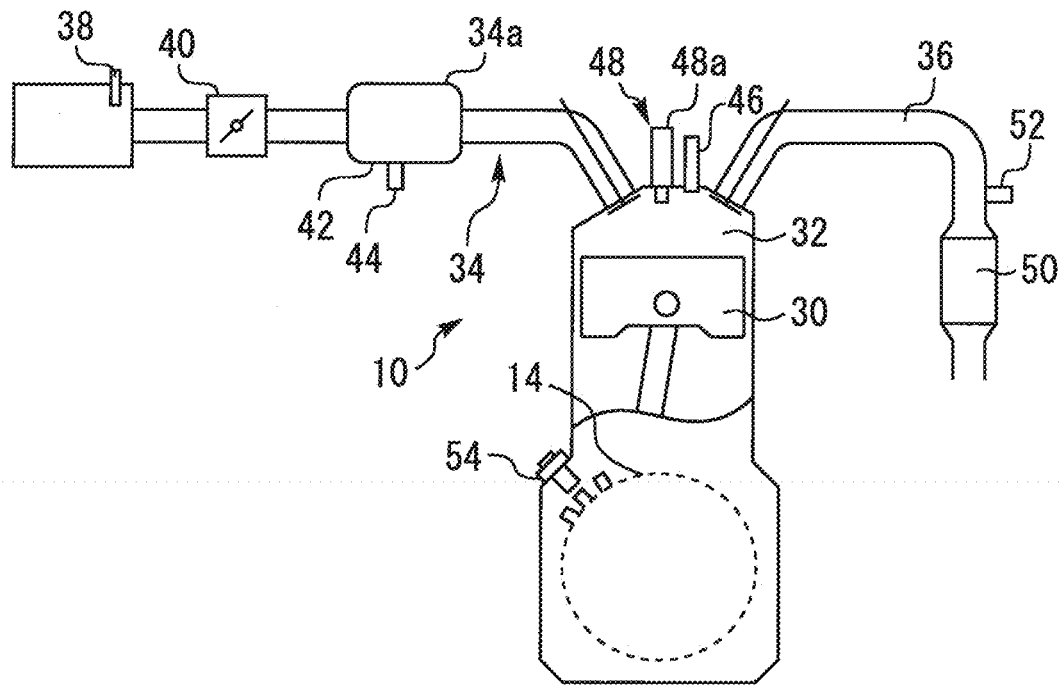
FIG. 2 is a schematic diagram for describing an example of the configuration of an internal combustion engine mounted on a vehicle shown in FIG. 1.

FIG. 2 is a schematic diagram for describing an example of the configuration of the internal combustion engine 10 mounted on the vehicle 1 shown in FIG. 1. As an example, the internal combustion engine 10 is a V-type six-cylinder gasoline engine. However, the number and arrangement of cylinders of internal combustion engines applicable to the present disclosure are not particularly limited. A piston 30 is arranged in each cylinder of the internal combustion engine 10. A combustion chamber 32 is formed on the top side of the piston 30 in each cylinder. An intake air passage 34 and an exhaust gas passage 36 communicate with each combustion chamber 32.

An air flow sensor 38 that outputs a signal responsive to the flow rate of the air that is taken into the intake air passage 34 is installed in the vicinity of the inlet of the intake air passage 34. An electronically-driven throttle valve 40 is installed in a portion of the intake air passage 34 located on the downstream side of the air flow sensor 38. Moreover, an intake manifold 34a for distributing the intake air toward the individual cylinders is arranged downstream of the throttle valve 40. Inner passages of the intake manifold 34a serve as a part of the intake air passage 34. An intake air pressure sensor 44 that outputs a signal responsive to the intake manifold pressure (i.e., throttle-downstream pressure) is attached to a connecting portion 42 of the intake manifold 34a.

Furthermore, the internal combustion engine 10 is equipped with fuel injection valves 46 and an ignition device 48 (only a spark plug 48a is illustrated). The fuel injection valves 46 are installed in the respective cylinders, and configured to inject fuel directly into the respective combustion chambers 32 (i.e., into the respective cylinders). The ignition device 48 is configured to ignite an air-fuel mixture in each cylinder by the use of the spark plug 48a that is arranged in each cylinder.

In order to purify the exhaust gas, a catalyst (in detail, three-way catalyst) 50 is installed in the exhaust gas passage 36. In a portion of the exhaust gas passage 36 located on the upstream side of the catalyst 50, an air-fuel ratio sensor 52 that outputs a signal responsive to the air-fuel ratio of the exhaust gas from each cylinder is installed. Moreover, the internal combustion engine 10 is equipped with a crank angle sensor 54 that outputs a signal responsive to the crank angle.

As shown in FIG. 1, the system according to the present embodiment further includes an electronic control unit (ECU) 60. Various sensors installed in the internal combustion engine 10 and the vehicle 1 on which the internal combustion engine 10 is mounted, and various actuators for controlling the operation of the internal combustion engine 10 and the vehicle 1 are electrically connected to the ECU 60.

The various sensors described above include a sensor group 62 attached to the internal combustion engine 10 (including the air flow sensor 38, the intake air pressure sensor 44, the air-fuel ratio sensor 52 and the crank angle sensor 54) and an accelerator position sensor 64. The ECU 60 can obtain an engine speed NE by the use of the signal of the crank angle sensor 54. The accelerator position sensor 64 outputs a signal responsive to the depression amount of the accelerator pedal (i.e., accelerator position) of the vehicle 1. Moreover, the various actuators described above include the MG12, the clutch 16, the transmission 20, the throttle valve 40, the fuel injection valves 46 and the ignition device 48 that are described above. Furthermore, an ignition switch (IG switch) 66 used for the driver of the vehicle 1 to command a start-up request of the vehicle system and a stopping request thereof is electrically connected to the ECU 60.

The ECU 60 includes a processor, a memory, and an input/output interface. The input/output interface receives sensor signals from the various sensors described above, and also outputs actuating signals to the various actuators described above. In the memory, various control programs and maps for controlling the various actuators are stored. The processor reads out a control program from the memory and executes the control program. As a result, functions of the "control device for an internal combustion engine" according to the present embodiment are achieved. It should be noted that the number of ECUs that achieve the functions of the control device may also be plural.

1-2. Engine Control According to First Embodiment

1-2-1. Automatic Stop Control and Automatic Start-up Control of Internal Combustion Engine (Engine Intermittent Operation)

According to the vehicle 1 having the configuration described above, the start-up and stop of the internal combustion engine 10 is performed not only in response to the operation of the ignition switch by the driver but also by an "automatic stop control" and an "automatic start-up control" as described below.

In detail, when a predetermined automatic stop condition is met, the automatic stop control mentioned here performs a fuel cut during operation of the vehicle system equipped with the internal combustion engine 10 (i.e., during a temporal stop or running of the vehicle 1) to intermittently stop the internal combustion engine 10. When a predetermined automatic start-up condition is met during an engine stop by the automatic stop control, the automatic start-up control performs a restart of the internal combustion engine 10.

1-2-1-1. Example of Early Start-up Control

The automatic start-up control according to the present embodiment is performed by the use of an "early start-up control" as described below. The early start-up control mentioned here injects fuel early by the use of the fuel injection valve 46 that directly injects fuel into the cylinder to commence the restart. According to the early start-up control, the fuel injection is started from a "fuel-injection-start cylinder". A cylinder in which a piston is stopped in an expansion stroke (hereunder, referred to an "expansion stroke stop cylinder") during an engine stop by the automatic stop control, or a cylinder in which a piston is stopped in a compression stroke (hereunder, referred to an "compression stroke stop cylinder") during the engine stop correspond to this fuel-injection-start cylinder, and, in more detail, a cylinder in which a torque that starts a positive rotation of the crankshaft 14 is generated corresponds to this fuel-injection-start cylinder.

An example of the early start-up control used in the present embodiment is a so-called "ignition start-up control". This ignition start-up control starts the fuel injection and the ignition from the expansion stroke stop cylinder corresponding to the fuel-injection-start cylinder and thereby commences the re-start of the internal combustion engine 10 which is put in a warmed state.

It should be noted that examples of the automatic start-up control (early start-up control) according to the present disclosure are not limited to the ignition start-up control that is performed in the manner described above. That is to say, another example of the automatic start-up control may be an ignition start-up control that is performed in a manner as described below. In detail, according to this ignition start-up control, firstly, a crankshaft is once reversely rotated by performing a fuel injection and an ignition for the compression stroke stop cylinder, and a fuel injection for the expansion stroke stop cylinder is also performed. Then, an ignition for the compression stroke stop cylinder in which the in-cylinder pressure has increased as a result of the reverse (negative) rotation is performed, whereby the positive rotation of the crankshaft is started. In this example, the expansion stroke stop cylinder also corresponds to the fuel-injection-start cylinder.

Moreover, examples of the automatic start-up control according to the present disclosure may also be, for example, a "one-TDC start-up control" as described below instead of the ignition start-up controls in the two manners described above, as long as the restart is commenced by starting fuel injection from the expansion stroke stop cylinder or the compression stroke stop cylinder during an engine stop. In order to commence the restart, this one-TDC control starts the fuel injection from the compression stroke stop cylinder while rotating the crankshaft in its positive direction by the use of an electric motor (for example, MG12 or starter-motor), and performs the ignition after the piston 30 of this compression stroke stop cylinder reaches the compression top dead center. In this example, the compression stroke stop cylinder corresponds to the fuel-injection-start cylinder.

Figure 3:
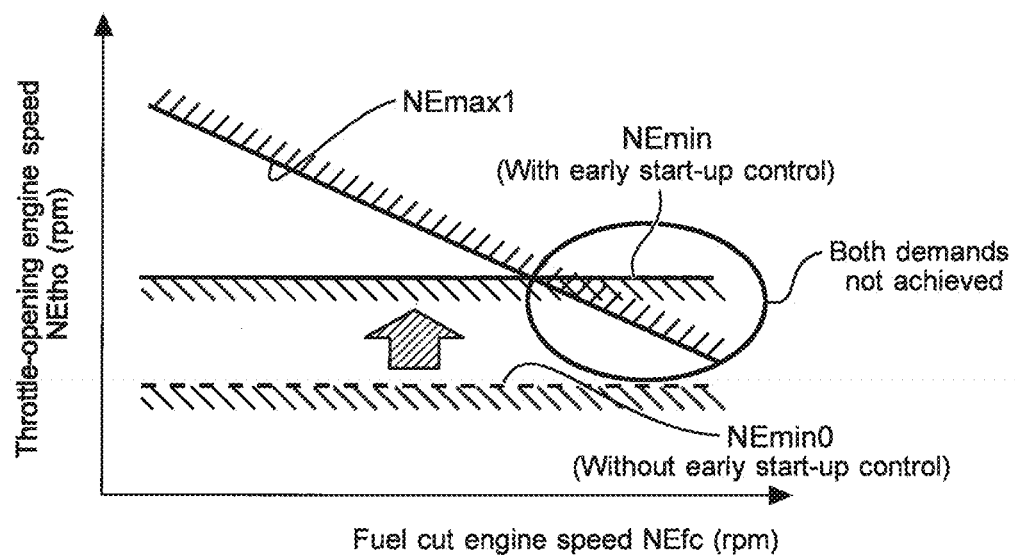
FIG. 3 is a graph for describing an issue on an automatic stop control executed when using an early start-up control.

1-2-2. Issue on Automatic Stop Control Executed When Using Early-Start-Up Control FIG. 3 is a graph for describing an issue on the automatic stop control executed when using the early start-up control. The horizontal axis of FIG. 3 denotes an engine speed at the start of the fuel cut (hereunder, referred to as a "fuel cut engine speed NEfc"), and the vertical axis thereof denotes an engine speed at the start of opening of the throttle valve 40 in the course of the engine stop in which the automatic stop control is executed (hereunder, referred to as a "throttle-opening engine speed NEtho").

In order to achieve a favorable startability when the early start-up control is used, it is required to properly charge the air into the fuel-injection-start cylinder (hereunder, also referred to as an "air charging demand"). This is because, in order to generate a favorable torque with a predetermined amount of fuel injected by the fuel-injection-start cylinder, the charging of a proper amount of the air according to this predetermined amount of fuel is required. In more detail, according to the present embodiment in which the ignition start-up control is used as the early start-up control, it is required to properly charge the air into the expansion stroke stop cylinder and the compression stroke stop cylinder. This also applies to the ignition start-up control in the latter manner described above. In addition, in the example of the one-TDC start-up control is used, it is required to properly charge the air into the compression stroke stop cylinder.

The charging of the air into the fuel-injection-start cylinder is performed when a cylinder destined to be the fuel-injection-start cylinder later is in the last intake stroke in the course of the engine stop after a fuel cut for the intermittent stop. Thus, in order to properly charge the air into the fuel-injection-start cylinder, it is required to increase the intake manifold pressure (throttle-downstream pressure) to around atmospheric pressure before a cylinder destined to be the fuel-injection-start cylinder later completes the last intake stroke. That is to say, when the early start-up control is used, it is required to increase the throttle-downstream pressure to around atmospheric pressure earlier in the course of the engine stop, as compared to the technique disclosed in JP 5305619 B in which a throttle valve is controlled to increase the intake manifold pressure to around atmospheric pressure immediately after an engine stop.

Additionally, a timing at which a cylinder destined to be the expansion stroke stop cylinder later reaches the last intake stroke is earlier than a timing at which a cylinder destined to be the compression stroke stop cylinder later reaches the last intake stroke. Because of this, in the example of the ignition start-up control, if the intake manifold pressure can be increased to around atmospheric pressure before the cylinder destined to be the expansion stroke stop cylinder later completes the last intake stroke, the air can be properly charged not only into the expansion stroke stop cylinder but also into the compression stroke stop cylinder.

In order to satisfy the air charging demand described above, it is required to advance a timing at which the throttle valve is opened after the fuel cut (i.e., to increase the "throttle-opening engine speed NEtho" at which the throttle valve is opened in the course of the engine stop after the fuel cut). To be more specific, a "minimum engine speed NEmin" shown in FIG. 3 corresponds to a lower limit value of the throttle-opening engine speed NEtho that is required to complete an engine stop in a state in which the charging efficiency of the cylinder destined to be the fuel-injection-start cylinder later becomes the highest. In other words, the minimum engine speed NEmin corresponds to a value required to increase the throttle-downstream pressure to around atmospheric pressure until the cylinder destined to be the fuel-injection-start cylinder later completes the last intake stroke in the course of the engine stop. In contrast to this, a "minimum engine speed NEmin0" referred to for comparison corresponds to a lower limit value of the throttle-opening engine speed NEtho that is required to increase the throttle-downstream pressure to around atmospheric pressure immediately after the engine stop. As shown in FIG. 3, the minimum engine speed NEmin in the example of the early start-up control being used (i.e., in the present embodiment) becomes higher than the minimum engine speed NEmin in an example of the early start-up control being not used (i.e., in the technique disclosed in JP 5305619 B, for example).

On the other hand, the higher the fuel cut engine speed NEfc in the automatic stop control for the intermittent stop is, the longer a duration of the internal combustion engine rotating in the course of the engine stop after the fuel cut becomes. If this duration becomes longer, the amount of the air (intake air) flowing out toward a catalyst becomes greater. As a result, the air-fuel ratio of the atmosphere of the catalyst becomes leaner (oxygen excess). In order to reduce this kind of phenomenon of making lean the atmosphere of the catalyst, it is required to cause the throttle-opening engine speed NEtho to be lower when the fuel cut engine speed NEfc is higher. It should be noted that, if the atmosphere of the catalyst is made lean, a large stress may act on the catalyst during the intermittent stop, or an exhaust emission performance (for example, emission of nitrogen oxide NOx) at the restart after the intermittent stop may deteriorate.

A "maximum engine speed NEmax1" shown in FIG. 3 corresponds to an example of the upper limit of the throttle-opening engine speed NEtho capable of reducing, to a predetermined level or lower, the phenomenon of making lean the atmosphere of the catalyst associated with an execution of the intermittent stop. In more detail, the maximum engine speed NEmax1 corresponds to an upper limit of the throttle-opening engine speed NEtho capable of reducing, to a predetermined value (for example, a value greater than the stoichiometric air-fuel ratio) or smaller, the value of the air-fuel ratio of the atmosphere of the catalyst at the completion of the engine stop (without an air-fuel ratio rich processing described above). Moreover, due to the above-described demand to decrease the throttle-opening engine speed NEtho, the maximum engine speed NEmax1 becomes lower when the fuel cut engine speed NEfc is higher as shown in FIG. 3.

As described above, a demand to the throttle-opening engine speed NEtho in terms of the air charging and a demand to the throttle-opening engine speed NEtho in terms of reducing the phenomenon of making lean the atmosphere of the catalyst is contradictory to each other. Thus, there is a concern that, when the fuel cut engine speed NEfc within the high fuel cut engine speed range in the example shown in FIG. 3 is used, it may become difficult to obtain the throttle-opening engine speed NEtho that can achieve both the two demands described above. Also, this may lead to limiting the range of the fuel cut engine speed NEfc that is available when the intermittent stop is performed.

1-2-3. Outline of Automatic Stop Control According to First Embodiment

Figure 4:
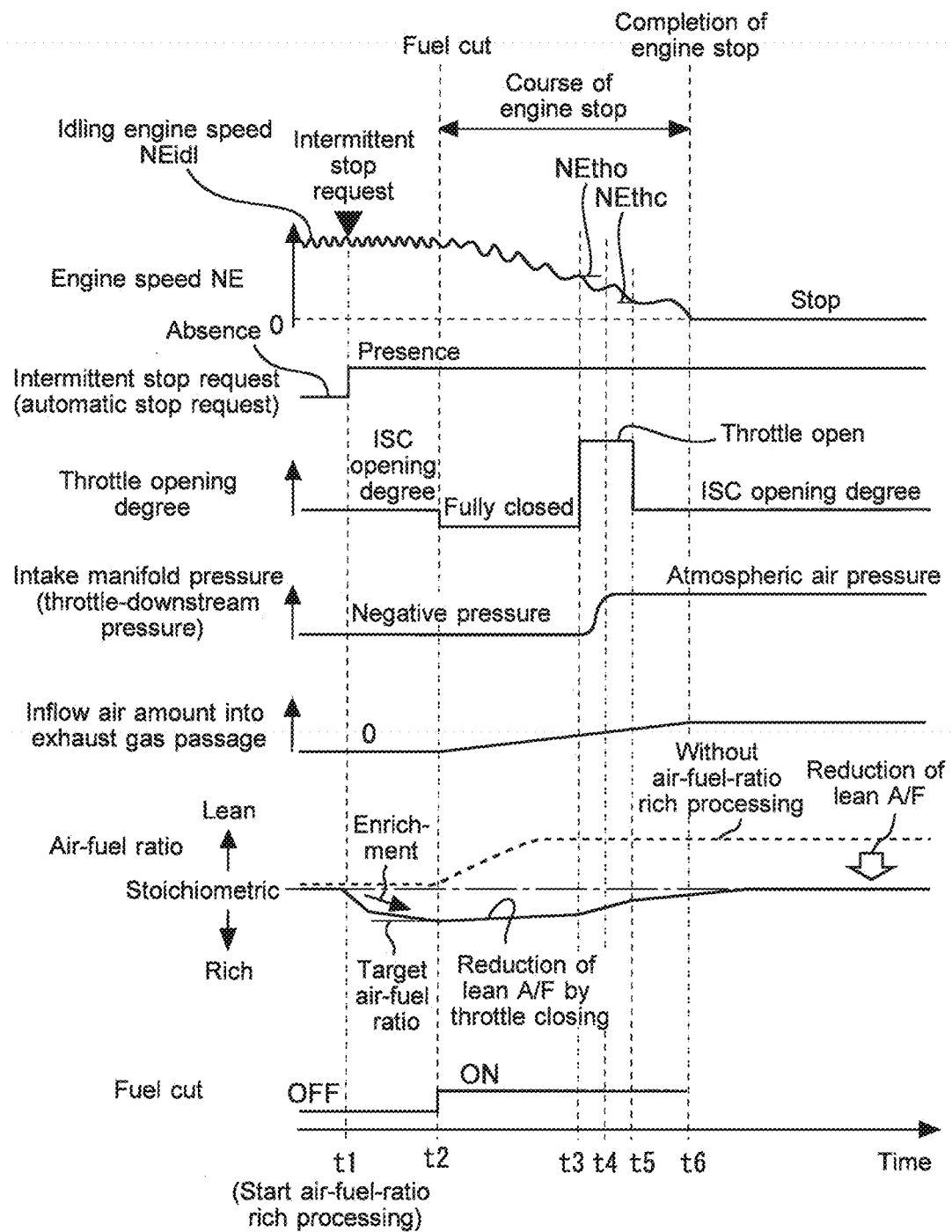
FIG. 4 is a time chart for describing the outline of the automatic stop control according to the first embodiment of the present disclosure.

FIG. 4 is a time chart for describing the outline of the automatic stop control according to the first embodiment of the present disclosure. The automatic stop control according to the present embodiment mainly includes an air-fuel-ratio rich processing, a throttle closing processing and a throttle opening processing as described below. It should be noted that, as shown in FIG. 4, the course of the engine stop means a duration from the start (time point t2) of the fuel cut for an engine stop to the completion of the engine stop (time point t6).

1-2-3-1. Air-Fuel-Ratio Rich Processing

A time point t1 in FIG. 4 corresponds to a time point at which an intermittent stop request (automatic stop request) is issued during an idling operation. The throttle valve 40 is controlled so as to have an ISC (Idling Speed Control) opening degree during the idling operation. As a result, the intake manifold pressure (throttle-downstream pressure) becomes negative (i.e., becomes lower than the atmospheric air pressure). Moreover, during the idling operation in which combustion is performed, the amount of inflow of the air (intake air) into the exhaust gas passage 36 is zero. Furthermore, the air-fuel ratio is controlled to the stoichiometric air-fuel ratio during the idling operation. This kind of control of the air-fuel ratio is performed by the use of, for example, a known air-fuel ratio feedback control for causing the air-fuel ratio to approach a target air-fuel ratio that is the stoichiometric air-fuel ratio.

According to the automatic stop control of the present embodiment, the air-fuel-ratio rich processing is started at the time point t1 at which an intermittent stop request is issued during the idling operation, prior to the start of the fuel cut. According to the air-fuel-ratio rich processing, as shown in FIG. 4, the air-fuel ratio is controlled so as to have a value richer than the stoichiometric air-fuel ratio. In detail, the air-fuel-ratio rich processing can be performed by, for example, increasing (i.e., making rich) the target air-fuel ratio by a predetermined value with respect to the stoichiometric air-fuel-ratio. The waveform of the air-fuel-ratio shown in FIG. 4 corresponds to a waveform of the air-fuel-ratio of the exhaust gas detected by the air-fuel ratio sensor 52 (i.e., air-fuel-ratio of the atmosphere of the catalyst). In association with the execution of the air-fuel-ratio rich processing, the air-fuel-ratio is made rich as shown by the solid line in FIG. 4.

(Spark Retard Associated with Air-Fuel-Ratio Rich Processing)

If the air-fuel-ratio rich processing is executed, the engine torque becomes greater. Because of this, if no countermeasures are taken, the engine speed NE (i.e., idling engine speed NEidl) becomes higher. Accordingly, in order to reduce an increase of the idling engine speed NEidl associated with an execution of the air-fuel-ratio rich processing, according to the automatic stop control of the present embodiment, the retard of the spark timing is performed in synchronization with the air-fuel-ratio rich processing. In detail, the spark timing is retarded as compared to a value that is set for a normal idling operation.

(Advantageous Effects Concerning Air-Fuel-Ratio Rich Processing)

The air-fuel-ratio of the atmosphere of the catalyst can be enriched before the start of the fuel cut by performing the air-fuel-ratio rich processing prior to the start of the fuel cut. As a result, when the air whose oxygen concentration is high flows into the catalyst 50 in response to the execution of the fuel cut thereafter, the oxidation-reduction reaction is performed with good balance between oxygen included in the air flowing into the catalyst 50 and the fuel supplied in advance as a reductant agent by the use of the enrichment. The air-fuel-ratio of the atmosphere of the catalyst can become easy to be maintained at a value near the stoichiometric air-fuel-ratio by executing this kind of the air-fuel-ratio rich processing as well as the throttle closing processing described later. In other words, the phenomenon of making lean the atmosphere of the catalyst can be reduced.

Figure 5:
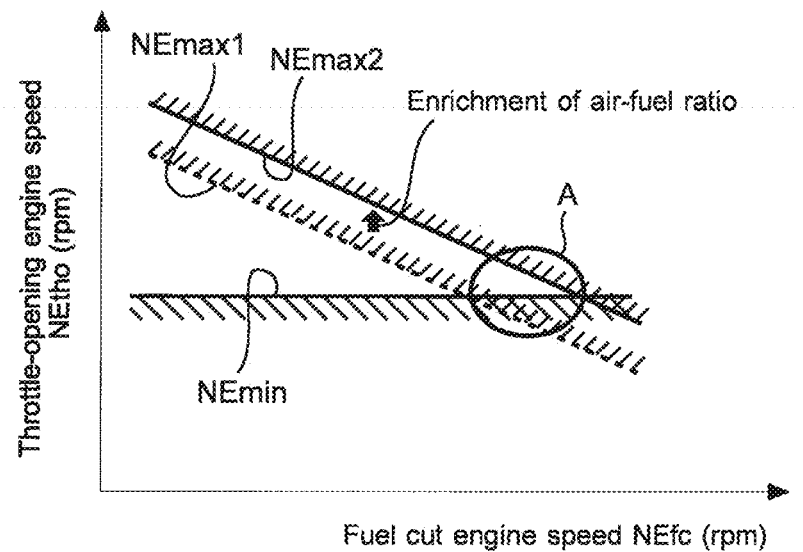
FIG. 5 is a graph that represents advantageous effects concerning an air-fuel-ratio rich processing.

FIG. 5 is a graph that represents the advantageous effects concerning the air-fuel-ratio rich processing. The maximum engine speed NEmax1 described above with reference to FIG. 3 corresponds to an upper limit of the throttle-opening engine speed NEtho capable of reducing, to the predetermined level or lower, the phenomenon of making lean the atmosphere of the catalyst without the air-fuel-ratio rich processing. On the other hand, a maximum engine speed NEmax2 shown in FIG. 5 corresponds to an upper limit of the throttle-opening engine speed NEtho capable of reducing, to the equivalent level or lower, the phenomenon of making lean the atmosphere of the catalyst with the air-fuel-ratio rich processing described above. As shown in FIG. 5, according to the execution of the air-fuel-ratio rich processing, the upper limit of the throttle-opening engine speed NEtho capable of reducing, to the equivalent level or lower, the phenomenon of making lean the atmosphere of the catalyst can be increased from the maximum engine speed NEmax1 to the maximum engine speed NEmax2. In other words, with the air-fuel-ratio rich processing, the phenomenon of making lean the atmosphere of the catalyst can be reduced at the completion of the engine stop even if the fuel cut is started from a higher fuel cut engine speed NEfc. As a result, since the fuel cut engine speed NEfc can be increased, an engine speed range (as shown with symbol A in FIG. 5) that can achieve both the air charging demand and the demand of reduction of the phenomenon of making lean the atmosphere of the catalyst.

Moreover, according to the execution of the air-fuel-ratio rich processing, achievement of the following advantageous effects can also be expected regardless of the level of the fuel cut engine speed NEfc. That is to say, as a result of the oxidation-reduction reaction in the catalyst 50 being facilitated, a decrease of a catalyst floor temperature can be reduced in the course of the engine stop after the fuel cut in which the catalyst 50 is exposed to the air at ordinary temperatures. Furthermore, an advantageous effect of improvement of the exhaust gas emission performance at the next restart can be achieved due to a decrease of the fuel increment at this restart.

The latter advantageous effects described above will be described in more detail. If the air-fuel-ratio rich processing is executed, the phenomenon of making lean the atmosphere of the catalyst is reduced as described above. In contrast to this, if the air-fuel-ratio rich processing is not executed, the atmosphere of the catalyst is put in an excessively lean state after the engine stop. In general, a fuel increment is performed at the restart in order to improve the startability. If the atmosphere of the catalyst is in an excessively lean state at the restart, the excessively lean state may not be completely dissolved by the use of this kind of fuel increment. If the operation of the internal combustion engine is continuously performed without dissolving the excessively lean state at the restart and the air-fuel-ratio is then controlled to the stoichiometric air-fuel-ratio in response to a high load request, the amount of emission of NOx increases due to a shortage of the redundant agent. Also, in order to reduce this increase of emission of NOx, it is required to increase the fuel increment at the restart. However, when the degree of enrichment becomes higher due to an increase of the fuel increment, the amounts of emission of particulate matter PM, unburned hydrocarbon HC and carbon monoxide CO become greater in association therewith (in particular, the amount of PM emission becomes greater exponentially). In this way, there is a trade-off relationship between reduction of emission of NOx and reduction of emission of PM, HC and CO. In this regard, it can be said that, according to the execution of the air-fuel-ratio rich processing, a part of the fuel increment required at the restart in order to dissolve the excessively lean state of the atmosphere of the catalyst can be performed in the course of the engine stop. In other words, it can be said that the fuel increment required to dissolve the excessively lean state can be shared with good balance between the course of the engine stop and the restart thereafter. Therefore, as described above, the advantageous effects of improvement of the exhaust gas emission performance (in particular, reduction of emission of PM) at the next restart can be achieved due to a decrease of the fuel increment at this restart.

1-2-3-2. Fuel Cut (and Fuel-Cut Engine-Speed Correction Processing)

The time point t2 in FIG. 4 corresponds to a time point at which the air-fuel-ratio detected by the air-fuel ratio sensor 52 has reached the target air-fuel-ratio by the air-fuel-ratio rich processing. In the example shown in FIG. 4, the fuel cut is started at this time point t2. As a result, the fuel injections for the respective cylinders are sequentially stopped. In addition, the amount of the air that flows out into the exhaust gas passage 36 becomes greater in association with a lapse of time after the execution of the fuel cut.

Figure 6:
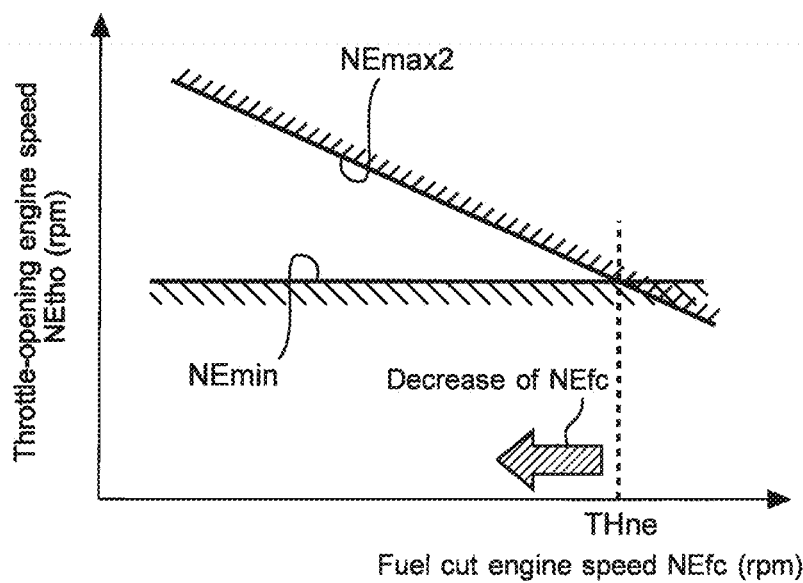
FIG. 6 is a graph for describing a fuel-cut engine-speed correction processing.

FIG. 6 is a graph for describing a fuel-cut engine-speed correction processing. As shown in FIG. 6, if the fuel cut engine speed NEfc is higher than a threshold value THne, it becomes difficult to achieve both the air charging demand and the demand of reduction of the phenomenon of making lean the atmosphere of the catalyst. Accordingly, according to the automatic stop control of the present embodiment, contrary to the example shown in FIG. 4, if the engine speed NE is higher than this threshold value THne when a request to execute an intermittent stop (automatic stop control) is issued, the fuel cut is executed after the engine speed NE (idling engine speed NEidl) is caused to be lower than or equal to the threshold value THne. It should be noted that the air-fuel-ratio rich processing described above may alternatively be executed before the execution of this correction processing, or be executed after the execution of the correction processing. In addition, the threshold value THen corresponds to an example of the "engine speed threshold value" according to the present disclosure.

The fuel-cut engine-speed correction processing can be executed, for example, as follows. That is to say, in order to cause the fuel cut engine speed NEfc to be lower than or equal to the threshold value THne, the idling operation is restarted after the fuel cut is once executed to cause the engine speed NE to be lower than or equal to the threshold value THen. This kind of manner is effective to quickly execute the correction processing when the difference of the engine speed NE is great before and after the execution of this correction processing. Furthermore, the correction processing described above may decrease the throttle opening degree while the idling operation being continuously performed, in order to cause the fuel cut engine speed NEfc to be lower than or equal to the threshold value THne. According to this kind of manner, when the difference of the engine speed NE is small before and after the execution of the correction processing, the correction processing can be performed while a drop of the engine speed NE with respect to a desired value is prevented.

1-2-3-3. Throttle Closing Processing

According to the automatic stop control of the present embodiment, the throttle closing control is executed in synchronization with the fuel cut. According to the throttle closing control, the throttle valve 40 is closed such that the throttle opening degree reaches an opening degree that is smaller than the ISC opening degree. In the example shown in FIG. 4, the throttle opening degree is controlled to a fully closed degree.

The waveform of the air-fuel-ratio shown by the broken line in FIG. 4 is associated with an example in which both the air-fuel-ratio rich processing and the throttle closing processing are not executed. According to this example, in association with the execution of the fuel cut at the time point t2, the air-fuel-ratio is made lean from the stoichiometric air-fuel-ratio. In contrast to this, according to the present embodiment (solid line), in association with the execution of the fuel cut, the air-fuel-ratio is made lean from a state of being enriched to the target air-fuel-ratio described above. Moreover, as shown in FIG. 4, according to the present embodiment (solid line) associated with the execution of the throttle closing processing, the proceeding of the phenomenon of making lean the air-fuel ratio with respect to a lapse of time is reduced as compared to the waveform shown by the broken line.

Additionally, in order to more effectively reduce the proceeding of the phenomenon of making lean the atmosphere of the catalyst, it is favorable to execute the throttle closing processing with taking into consideration the following point. In other words, it is favorable to execute the throttle closing processing before a cylinder of starting the fuel cut reaches the intake stroke first after the fuel cut. This makes it possible to cause the air (fresh air) not to flow into the exhaust gas passage 36 after the fuel cut in a state of the throttle valve 40 being opened with an opening degree greater than the throttle opening degree by the throttle closing processing (in the example in FIG. 4, which is the fully closed degree). In the example shown in FIG. 4, the throttle closing processing is executed simultaneously with the start of the fuel cut.

1-2-3-4. Throttle Opening Processing

A time point t3 in FIG. 4 corresponds to a time point at which the engine speed NE has reached the throttle-opening engine speed NEtho in the course of the engine stop after the execution of the throttle closing processing. According to the automatic stop control of the present embodiment, the throttle opening processing is executed at this time point t3. According to the throttle opening processing, the throttle valve 40 is opened to a first predetermined opening degree. This first predetermined opening degree may not always be a fully open degree, as long as it is an opening degree that meets a requirement that that intake manifold pressure can be increased to around atmospheric pressure in the course of the engine stop. Because of this, the first predetermined opening degree may alternatively be, for example, a minimum necessary opening degree (for example, 30 degrees) that can meet this requirement.

Figure 7:
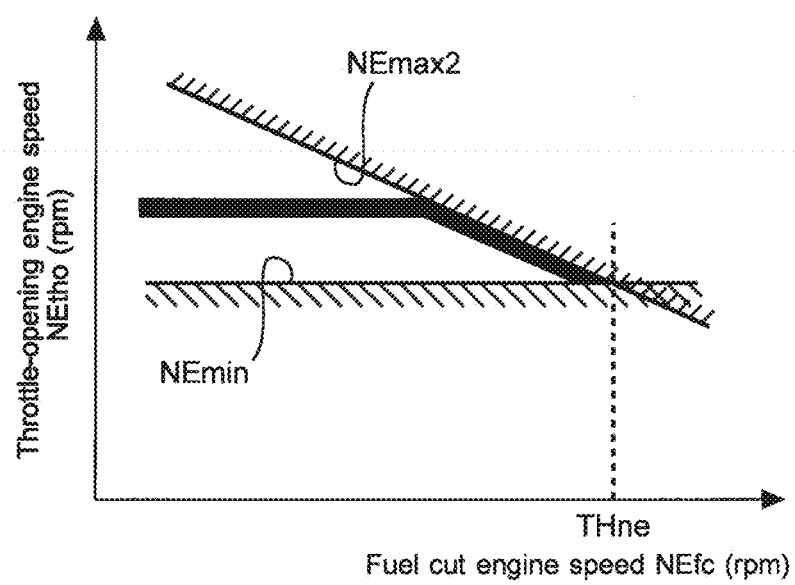
FIG. 7 is a graph that illustrates an example of a concrete setting of a throttle-opening engine speed NEtho.

FIG. 7 is a graph that illustrates an example of a concrete setting of the throttle-opening engine speed NEtho. Firstly, the throttle-opening engine speed NEtho is set such that it does not fall below the minimum engine speed NEmin as shown by the thick line in FIG. 7. This means that the throttle-opening engine speed NEtho is set so as to meet the following requirement. That is to say, the throttle-opening engine speed NEtho is set such that the following margin time can be obtainted. This margin time is required to open the throttle valve 40 such that the manifold pressure reaches the atmospheric air pressure before a cylinder destined to be the fuel-injection-start cylinder later completes the last intake stroke in the course of the engine stop.

Moreover, according to the present embodiment, the throttle-opening engine speed NEtho is determined on the basis of the fuel cut engine speed NEfc as an example. In detail, as shown in FIG. 7, in a low fuel-cut engine-speed range, the difference (i.e., available range) between the maximum engine speed NEmax2 and the minimum engine speed NEmin becomes greater (in other words, the degree of freedom concerning the selection of the throttle-opening engine speed NEtho becomes higher). Accordingly, in the example of the setting shown in FIG. 7, the throttle-opening engine speed NEtho in the low fuel-cut engine-speed range is set as a value near the center of the available range.

Here, even if a constant value is used as the throttle-opening engine speed NEtho, the sufficiency level of the air charging demand or the demand of reduction of the phenomenon of making lean the atmosphere of the catalyst may change due to a temporal factor, for example. In detail, the temporal factor mentioned here is a change of friction of the internal combustion engine 10 (for example, the proceeding of wear of a piston ring) or a change of the opening area of the intake air passage 34 due to attachment of deposits on the throttle valve 40. If, when, for example, the friction decreases due to the proceeding of wear of the piston ring, the throttle valve 40 is opened with a value of the throttle-opening engine speed NEtho used before the occurrence of the proceeding of the wear, a duration in which the internal combustion engine 10 rotates in the course of the engine stop thereafter becomes longer. As a result, the amount of the air that flows out into the exhaust gas passage 36 becomes greater. Moreover, if the opening area of the intake air passage 34 becomes smaller due to the attachment of the deposits on the throttle valve 40, it becomes difficult for the air to be flown out to the exhaust gas passage 36, while a proper amount of the air becomes difficult to be charged into the cylinders. Furthermore, the behavior of the internal combustion engine 10 in the course of the engine stop after the execution of the fuel cut for an intermittent stop may change not only due to the temporal factor described above but also due to, for example, a variation between engines of the same type concerning the friction of the internal combustion engine 10 or an exchange to an engine oil having different properties (i.e., unexpected factor).

According to the example of the setting shown in FIG. 7 concerning the low fuel-cut engine-speed range, the throttle-opening engine speed NEtho can be determined so as to be easy to meet the two demands described above even under the effects of some sorts of variation factors described above.

Moreover, according to the example of the setting shown in FIG. 7, in a high fuel-cut engine-speed range, the throttle-opening engine speed NEtho is determined so as to be a value near the maximum engine speed NEmax2, in other words, so as to be lower when the fuel cut engine speed NEfc is higher. This corresponds to an example of the setting in which the throttle-opening engine speed NEtho is made lower when the fuel cut engine speed NEfc is higher within the high fuel-cut engine-speed range, than when it is lower. According to this kind of setting, the throttle-opening engine speed NEtho can be set with giving priority to ensuring a maximum possible margin of the throttle-opening engine speed NEtho with respect to the minimum engine speed NEmin in order to enable the air charging demand to be surely met, while also satisfying the demand of reduction of the phenomenon of making lean the atmosphere of the catalyst. Additionally, the reason why this kind of setting is favorable is that surely meeting the air charging demand is an important factor to achieve a good restartability by the early start-up control and it is thus favorable to give more priority to the air charging demand than the demand of reduction of the phenomenon of making lean the atmosphere of the catalyst.

As shown in FIG. 4, the intake manifold pressure (throttle-downstream pressure) becomes higher as a result of the throttle valve 40 being opened with the first predetermined opening degree at the time point t3. A time point t4 corresponds to a time point at which a cylinder destined to be the fuel-injection-start cylinder (expansion stroke stop cylinder) later completes the last intake stroke in the course of the engine stop. According to the example shown in FIG. 4, since the throttle valve 40 is opened at the throttle-opening engine speed NEtho described above, the intake manifold pressure is reached to the atmospheric air pressure at this time point t4. Because of this, the air charging demand described above can be meet.

It should be noted that, according to the example of the setting shown in FIG. 7, in the high fuel-cut engine-speed range, the throttle-opening engine speed NEtho is determined so as to be lower when the fuel cut engine speed NEfc is higher. Here, an example is supposed in which, depending on the specifications of an internal combustion engine or the degree of the advantageous effects concerning the air-fuel-ratio rich processing, a line of the maximum engine speed NEmax obtained when the air-fuel-ratio rich processing is used becomes higher than a line of the maximum engine speed NEmax2 shown in FIG. 7 and, as a result, the line of the maximum engine speed NEmax does not intersect with a line of the minimum engine speed NEmin. In this kind of example, contrary to the example of the setting shown in FIG. 7, the throttle-opening engine speed NEtho may alternatively be set so as to be constant (or substantially constant) without depending on the level of the fuel cut engine speed NEfc.

1-2-3-5. Closing of Throttle Valve Taken into Consideration Restart

A time point t5 in FIG. 4 corresponds to a time point at which the engine speed NE reaches a throttle-closing engine speed NEthc after the elapse of the time point t4. According to the automatic stop control of the present embodiment, the throttle valve 40 is closed again at this time point t5. In detail, the throttle valve 40 is closed from the above-described first predetermined opening degree toward a second predetermined opening degree smaller than that. This makes it possible to reduce an excessive charging of the air into a cylinder that reaches the intake stroke immediately after the start of the subsequent restart that uses the automatic start-up control, and, as a result, to reduce an excessive increase of the engine speed NE. For example, an opening degree obtained when the energization to the throttle valve 40 is not performed or a predetermined opening degree for engine start-up corresponds to the second predetermined opening degree for achieving this kind of advantageous effects. It should be noted that this kind of closing operation of the throttle valve 40 may alternatively be executed during an engine stop duration after completion of the engine stop.

1-2-4. Second Restart Control (Time of Change of Mind)

A restart request from the driver (change-of-mind request) may be issued when the throttle valve 40 is closed by the throttle closing processing in the course of the engine stop after the start of the fuel cut for the automatic stop. According to the present embodiment, when the ECU 60 receives this kind of restart request, it discontinues the automatic stop control and executes a "second restart control" that is different from the automatic start-up control. In other words, when this request is received, the automatic start-up control that uses the ignition start-up control is prohibited.

According to the second restart control, the fuel injection is restated after the throttle valve 40 is opened in the course of the engine stop after the automatic stop control is discontinued. In more detail, in response to the restart request, the throttle valve 40 is immediately controlled so as to have a third predetermined opening degree (for example, ISC opening degree). Then, after the intake manifold pressure is increased to a predetermined value (for example, atmospheric air pressure) in association with the opening of the throttle valve 40, the fuel injection and ignition for each cylinder are started.

Figure 8:
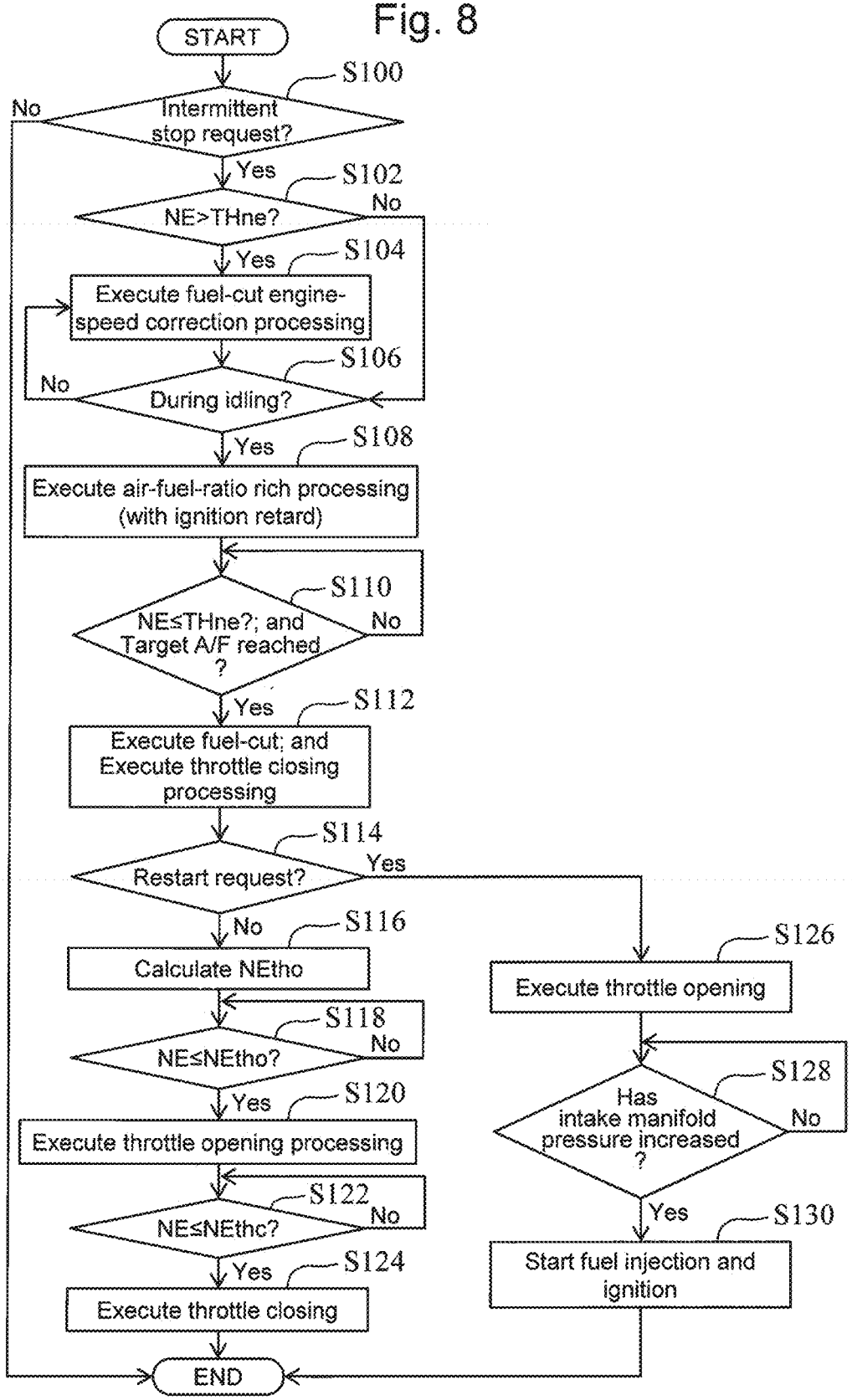
FIG. 8 is a flow chart that illustrates a routine of the processing concerning the automatic stop control and a second restart control according to the first embodiment of the present disclosure.

1-2-5. Processing of ECU Concerning Automatic Stop Control and Second Restart Control FIG. 8 is a flow chart that illustrates a routine of the processing concerning the automatic stop control and the second restart control according to the first embodiment of the present disclosure. The ECU 60 repeatedly executes the present routine during operation of the internal combustion engine 10.

(Step S100)

According to the routine shown in FIG. 8, firstly, the ECU 60 determines whether or not there is an intermittent stop request (i.e., automatic stop request) of the internal combustion engine 10, that is, whether or not a predetermined automatic stop condition is met. The automatic stop condition includes, for example, whether or not a required driving force of the vehicle 1 based on the accelerator position is smaller than a predetermined threshold value. If the determination result of step S100 is positive, the processing proceeds to step S102, and, if, on the other hand, this determination result is negative, the present routine is ended.

(Step S102)

If the determination result of step S100 is positive, the ECU 60 determines whether or not the engine speed NE is higher than the threshold value THne described above. As a result, if the engine speed NE is higher than the threshold value THne, that is, if it is required to lower the fuel cut engine speed NEfc in order to achieve both the air charging demand and the demand of reduction of the phenomenon of making lean the atmosphere of the catalyst, the processing proceeds to step S104. On the other hand, if the engine speed NE is lower than or equal to the threshold value THne, that is, if it is not required to lower the fuel cut engine speed NEfc, the processing proceeds to step S106.

(Step S104)

The ECU 60 executes the fuel-cut engine-speed correction processing. This correction processing can be performed by the use of the fuel cut or the adjustment of the throttle opening degree as already described with reference to FIG. 6, in order to lower the fuel cut engine speed NEfc to a target value (for example, predetermined value) that is smaller than or equal to the threshold value THne.

(Step S106)

The ECU 60 determines whether or not the internal combustion engine 10 is in the idling operation. As a result, if the internal combustion engine 10 is not in the idling operation state, the processing returns to step S104. In more detail, in the example in which a fuel cut for the fuel-cut engine-speed correction processing is executed, if the internal combustion engine 10 does not transition to the idling operation state after this fuel cut is executed, the processing returns to step S104. If, on the other hand, the internal combustion engine 10 is in the idling operation state, the processing proceeds to step S108.

(Step S108)

The ECU 60 executes the air-fuel-ratio rich processing. As already described, the air-fuel-ratio rich processing can be performed by, for example, changing the target air-fuel-ratio to a value that is greater than the stoichiometric air-fuel-ratio. Moreover, the ECU 60 executes the retard of the spark timing such that an increase of the idling engine speed NEidl associated with the execution of the air-fuel-ratio rich processing is reduced. After the execution of the processing of step S108, the processing proceeds to step S110.

(Step S110)

The ECU 60 determines whether or not the engine speed NE is lower than or equal to the threshold value THne and the air-fuel-ratio has reached the target air-fuel-ratio. The air-fuel-ratio used for this determination can be detected by the air-fuel ratio sensor 52, for example. In addition, the target air-fuel-ratio used for this determination refers to a value that has been changed by the air-fuel-ratio rich processing.

If the determination result of step S110 is negative, that is, if at least one of the fuel-cut engine-speed correction processing and the air-fuel-ratio rich processing is not completed, the ECU 60 repeatedly executes the determination of this step S110. If, on the other hand, this determination result is positive, that is, if the engine speed NE is controlled in a range of the threshold value THne or lower and the air-fuel-ratio rich processing is completed, the processing proceeds to step S112.

(Step S112)

The ECU 60 executes a fuel cut for an intermittent stop (i.e., automatic stop). Moreover, the ECU 60 executes the throttle closing processing described above in synchronization with the execution of the fuel cut. Thereafter, the processing proceeds to step S114.

(Step S114)

The ECU 60 determines whether or not there is a restart request (change-of-mind request) of the internal combustion engine 10 in a duration in which the throttle valve 40 is closed by the throttle closing processing. Whether or not there is this restart request can be determined on the basis of, for example, whether or not there is a depression of the accelerator pedal with an operation amount that is greater than or equal to a predetermined value. As a result, if the restart request is not issued, the processing proceeds to step S116. If, on the other hand, the restart request is issued, the processing proceeds to step S126.

(Step S116)

The ECU 60 calculates the throttle-opening engine speed NEtho according to the fuel cut engine speed NEfc used for the current intermittent stop. An example of calculation manner of the throttle-opening engine speed NEtho is as follows. That is to say, the ECU 60 stores, as a map, a relationship between the fuel cut engine speed NEfc and the throttle-opening engine speed NEtho that is defined as shown by the thick line in FIG. 7. The ECU 60 calculates the throttle-opening engine speed NEtho according to the fuel cut engine speed NEfc from this kind of map.

(Step S118)

The ECU 60 determines whether or not the engine speed NE has decreased to the throttle-opening engine speed NEtho or lower. As a result, if the engine speed NE has not decreased to the throttle-opening engine speed NEtho or lower, the ECU 60 repeatedly executes the determination of this step S118. If, on the other hand, the engine speed NE has decreased to the throttle-opening engine speed NEtho or lower, the processing proceeds to step S120.

(Step S120)

The ECU 60 executes the throttle opening processing described above. In detail, as already described, the throttle valve 40 is opened to the first predetermine opening degree. Thereafter, the processing proceeds to step S122.

(Step S122)

The ECU 60 determines whether or not the engine speed NE has decreased to the throttle-closing engine speed NEthc or lower. As a result, if the engine speed NE has not yet decreased to the throttle-closing engine speed NEthc or lower, the ECU 60 repeatedly executes the determination of this step S122. If, on the other hand, the engine speed NE has decreased to the throttle-closing engine speed NEthc or lower, the processing proceeds to step S124.

(Step S124)

The ECU 60 closes the throttle valve 40 so as to have the second predetermined opening degree described above. Thereafter, the present routine is ended.

(Step S126)

If the ECU 60 receives the restart request when the throttle valve 40 is in a closed state after the execution of the fuel cut, it opens the throttle valve 40 so as to have the third predetermined opening degree (for example, ISC opening degree). Thereafter, the processing proceeds to step S128.

(Step S128)

The ECU 60 determines whether or not the intake manifold pressure has increased to a predetermined value (for example, atmospheric air pressure). As a result, if the intake manifold pressure has not yet increased to the predetermined value, the ECU 60 repeatedly executes the determination of this step S128. If, on the other hand, the intake manifold pressure has increased to the predetermined value, the processing proceeds to step S130.

(Step S130)

The ECU 60 starts the fuel injection and ignition for the restart in series for each cylinder. Thereafter, the present routine is ended.

1-2-6. Advantageous Effects Concerning Engine Control According to First Embodiment In order to favorably satisfy the air charging demand in a system that uses the early start-up control (ignition start-up control or one-TDC start-up control) at the restart from an intermittent stop similarly to the internal combustion engine 10, it is required to increase the throttle-opening engine speed NEtho as compared to a system disclosed in JP 5305619 B that does not use this.

According to the automatic stop control of the present embodiment described so far, the air-fuel-ratio rich processing is executed before the start of the fuel cut for the intermittent stop. Also, the throttle closing processing is executed in synchronization with the fuel cut, and the throttle opening processing is executed in the course of the engine stop thereafter. According to the air-fuel-ratio rich processing, as already described with reference to FIG. 5, the upper limit of the throttle-opening engine speed NEtho required in terms of the reduction of the phenomenon of making lean the atmosphere of the catalyst can be increased from the maximum engine speed NEmax1 to the maximum engine speed NEmax2. Therefore, according to the automatic stop control of the present embodiment, in the system that uses the early start-up control, the intermittent operation of the internal combustion engine 10 can be performed while favorably achieving both a good startability by using a high throttle-downstream pressure and the reduction of the phenomenon of making lean the atmosphere of the catalyst.

Moreover, according to the automatic stop control of the present embodiment, the retard of the spark timing is executed in synchronization with the air-fuel-ratio rich processing. This makes it possible to reduce an unintended increase of the engine speed NE (i.e., idling engine speed NEidl) due to the execution of the air-fuel-ratio rich processing.

Moreover, according to the automatic stop control of the present embodiment, if the engine speed NE is higher than the threshold value THne when an intermittent stop request (i.e., request to execute the automatic stop control) is issued, the fuel-cut engine-speed correction processing is executed. Then, after the engine speed NE (i.e., idling engine speed NEidl) is lowered, by this correction processing, so as to be lower than or equal to the threshold value THne, the fuel cut is executed. Thus, the automatic stop control can be performed while more surely achieving both the air charging demand and the demand of reduction of the phenomenon of making lean the atmosphere of the catalyst, regardless of the level of the engine speed NE obtained when the intermittent stop request is issued.

Moreover, according to the automatic stop control of the present embodiment, as already described with reference to FIG. 7, when the fuel cut engine speed NEfc is higher within the high fuel-cut engine-speed range, the throttle-opening engine speed NEtho is set to be lower than when the fuel cut engine speed NEfc is lower. As represented in FIG. 7 as the maximum engine speed NEmax2, the limit (upper limit) of the throttle-opening engine speed NEtho in terms of the reduction of the phenomenon of making lean the atmosphere of the catalyst becomes more severe when the fuel cut engine speed NEfc is higher. Therefore, according to the setting described above, it becomes possible to set such a throttle-opening engine speed NEtho as to also satisfy the demand of reduction of the phenomenon of making lean the atmosphere of the catalyst while giving priority to ensure that the air charging demand is surely met.

Furthermore, a restart request for the internal combustion engine 10 (i.e., change-of-mind request) may be issued when the throttle valve 40 is closed by the throttle closing processing in the course of the engine stop. If the automatic stop control is normally continued and the automatic start-up control (ignition start-up control) is executed thereafter regardless of issuance of this kind of restart request, it becomes difficult to quickly respond to the restart request (i.e., change-of-mind request) from the driver. In contrast to this, according to the engine control of the present embodiment, when the restart request described above is received, the automatic stop control is discontinued and the second restart control is executed. According to the second restart control, the fuel injection is restarted after the throttle valve 40 is quickly opened in the course of the engine stop after discontinuing the automatic stop control. Thus, an engine control capable of quickly responding to the restart request from the driver issued in the course of the engine stop can be performed.

Second Embodiment

Next, a second embodiment according to the present disclosure will be described with reference to FIG. 9. In the following description, it is supposed that the configuration shown in FIG. 1 is used as an example of the configuration of a vehicle system according to the second embodiment. This also applies to a third embodiment described later.

2. Engine Control According to Second Embodiment

The engine control according to the present embodiment is different from the engine control according to the first embodiment in terms of a learning function of the throttle-opening engine speed NEtho described below is added with respect to the automatic stop control described in the first embodiment.

2-1. Outline of Automatic Closing Control Including Learning Function of NEtho

The throttle-opening engine speed NEtho that is suitable for achieving both the air charging demand and the demand of reduction of the phenomenon of making lean the atmosphere of the catalyst may change due to some sorts of variation factors (for example, a temporal factor, a variation between engines of the same type concerning the friction of an internal combustion engine or an exchange to an engine oil having different properties) as explained in the first embodiment.

Accordingly, according to the present embodiment, the throttle-opening engine speed NEtho is properly corrected, by the following learning function, so as to be able to cope with the variation factors described above. In detail, the throttle-opening engine speed NEtho used for the next or subsequent automatic stop control is corrected on the basis of each of an "intake manifold pressure Pstp" and an "exhaust air-fuel ratio AFstp".

The intake manifold pressure Pstp corresponds to a value of the intake manifold pressure (throttle-downstream pressure) obtained when a cylinder destined to be the fuel-injection-start cylinder later completes the last intake stroke in the course of the engine stop (i.e., obtained when a crank angle associated with the closing timing IVC of the last intake valve elapses). The exhaust air-fuel ratio AFstp corresponds to a value of the air-fuel ratio of the exhaust gas obtained when an engine stop by the automatic stop control is completed (for example, obtained immediately after the completion of the engine stop). It should be noted that the intake manifold pressure Pstp corresponds to an example of the "specified throttle-downstream pressure" according to the present disclosure, and the exhaust air-fuel ratio AFstp corresponds to an example of the "specified exhaust air-fuel ratio" according to the present disclosure.

The correction processing of the throttle-opening engine speed NEtho by the learning function described above corresponds to an example of the "first correction processing" according to the present disclosure. According to this correction processing, whether or not the automatic stop control that has been executed is good is determined on the basis of the intake manifold pressure Pstp and the exhaust air-fuel ratio AFstp. Hereunder, this will be described in more detail.

In an example in which the throttle-opening engine speed NEtho that has been set in advance is used similarly to the first embodiment, it may become difficult to surely obtain the intake manifold pressure Pstp that can properly meet the air charging demand due to the variation factors described above. Accordingly, according to the present embodiment, the intake manifold pressure Pstp obtained during the execution of the automatic stop control is compared to a predetermined threshold value THp. Then, if the intake manifold pressure Pstp is higher than or equal to the threshold value THp, it is determined that the automatic stop control that has been executed is good.

If, on the other hand, the intake manifold pressure Pstp is lower than the threshold value THp, it is determined that the automatic stop control that has been executed is not good (in other words, it is determined that the air charging demand may not be favorably met). Accordingly, the throttle-opening engine speed NEtho used for the next or subsequent automatic stop control is increased. It should be noted that the threshold value THp corresponds to an example of the "pressure threshold value" according to the present disclosure.

Furthermore, in an example in which the throttle-opening engine speed NEtho that is set in advance is used, it may become difficult to surely obtain the exhaust air-fuel ratio AFstp that can properly satisfy the demand of reduction of the phenomenon of making lean the atmosphere of the catalyst due to the variation factors described above. Accordingly, according to the present embodiment, the exhaust air-fuel ratio AFstp that is obtained during the execution of the automatic stop control is compared to a predetermined threshold value THaf. If, as a result, the exhaust air-fuel ratio AFstp is equal to or smaller than the threshold value THaf (i.e., if it is rich), it is determined that the automatic stop control that has been executed is good.

If, on the other hand, the exhaust air-fuel ratio AFstp is greater than the threshold value THaf (i.e., if it is lean), it is determined that the automatic stop control that has been executed is not good (in other words, it is determined that the demand of reduction of the phenomenon of making lean the atmosphere of the catalyst may not be favorably met). Accordingly, the throttle-opening engine speed NEtho used for the next or subsequent automatic stop control is decreased. It should be noted that the threshold value THaf corresponds to an example of the "air-fuel ratio threshold value" according to the present disclosure.

(Additional Countermeasure)

As already described, there is an upper limit (for example, see the maximum engine speed NEmax2 in FIG. 7) in the throttle-opening engine speeds NEtho that are selectable. Thus, there is a limitation on an increase of the throttle-opening engine speed NEtho that can be performed when the intake manifold pressure Pstp is lower than the threshold value THp. Therefore, according to the present embodiment, when, if the throttle-opening engine speed NEtho is increased, the throttle-opening engine speed NEtho exceeds the upper limit value (i.e., maximum engine speed NEmax2), the degree of enrichment of the air-fuel-ratio by the air-fuel-ratio rich processing is increased as well as an increase of the throttle-opening engine speed NEtho.

Moreover, from a point of view of reduction of the exhaust emission (emission of particulate matter PM, unburned hydrocarbon HC and carbon monoxide CO), there is also a limitation on an increase of the degree of enrichment of the air-fuel-ratio. Therefore, according to the present embodiment, if, when the throttle-opening engine speed NEtho exceeds the upper limit value described above as a result of an increase of the throttle-opening engine speed NEtho, the degree of enrichment cannot be increased due to the limitation described above, the following countermeasure is taken. That is to say, a decrease of the fuel cut engine speed NEfc is executed as well as an increase of the throttle-opening engine speed NEtho, instead of an increase of the degree of enrichment.

Moreover, as already described, there is a lower limit (for example, see the minimum engine speed NEmin in FIG. 7) in the throttle-opening engine speeds NEtho that are selectable. Thus, there is also a limitation on a decrease of the throttle-opening engine speed NEtho that can be performed when the exhaust air-fuel-ratio AFstp is greater than the threshold value THaf. Therefore, according to the present embodiment, when, if the throttle-opening engine speed NEtho is decreased, the throttle-opening engine speed NEtho falls below the lower limit value (i.e., minimum engine speed NEmin), the degree of enrichment of the air-fuel-ratio by the air-fuel-ratio rich processing is increased without decreasing the throttle-opening engine speed NEtho.

Furthermore, an increase of the degree of enrichment of the air-fuel-ratio has the limitation restriction described above. Therefore, according to the present embodiment, if, when the throttle-opening engine speed NEtho falls below the lower limit value described above as a result of a decrease of the throttle-opening engine speed NEtho, the degree of enrichment cannot be increased due to the limitation described above, the following countermeasure is taken. That is to say, a decrease of the fuel cut engine speed NEfc is executed without a decrease of the throttle-opening engine speed NEtho, instead of an increase of the degree of enrichment.

Additionally, according to the additional countermeasure that is executed when, if the throttle-opening engine speed NEtho is increased, the throttle-opening engine speed NEtho exceeds the upper limit value (i.e., maximum engine speed NEmax2), an increase of the throttle-opening engine speed NEtho is executed (is not omitted) as well as an increase of the degree of enrichment of the air-fuel-ratio or a decrease of the fuel cut engine speed NEfc. The reason why this kind of control is favorable is that surely meeting the air charging demand with an increase of the throttle-opening engine speed NEtho is an important factor to achieve a good restartability by the early start-up control and it is thus favorable to give more priority to the air charging demand than the demand of reduction of the phenomenon of making lean the atmosphere of the catalyst. On the other hand, due to this kind of reason, according to the additional countermeasure that is executed when, if the throttle-opening engine speed NEtho is decreased, the throttle-opening engine speed NEtho falls below the lower limit value (i.e., minimum engine speed NEmin), a decrease of the throttle-opening engine speed NEtho contrary to satisfaction of the air charging demand is not executed (is omitted).

2-2. Processing of ECU Concerning Learning Function of NEtho in Automatic Stop Control FIG. 9 is a flow chart that illustrates a subroutine of the processing (i.e., first correction processing) concerning the learning function of the throttle-opening engine speed NEtho in the automatic stop control according to the second embodiment of the present disclosure. According to the present embodiment, the subroutine shown in FIG. 9 is executed as well as a main routine basically similar to the routine shown in FIG. 8 described in the first embodiment.

To be more specific, the main routine described above is different from the routine shown in FIG. 8 in terms of the throttle-opening engine speed NEtho, the target air-fuel-ratio of the air-fuel-ratio rich processing, and the fuel cut engine speed NEfc are corrected, as needed, by the use of correction amounts A to D calculated by the processing of the subroutine described below. In addition, the present subroutine is started when the determination result of step S114 becomes negative after the execution of the fuel cut and throttle closing processing by the processing of step S112 of the main routine.

(Step S200)

Figure 9:
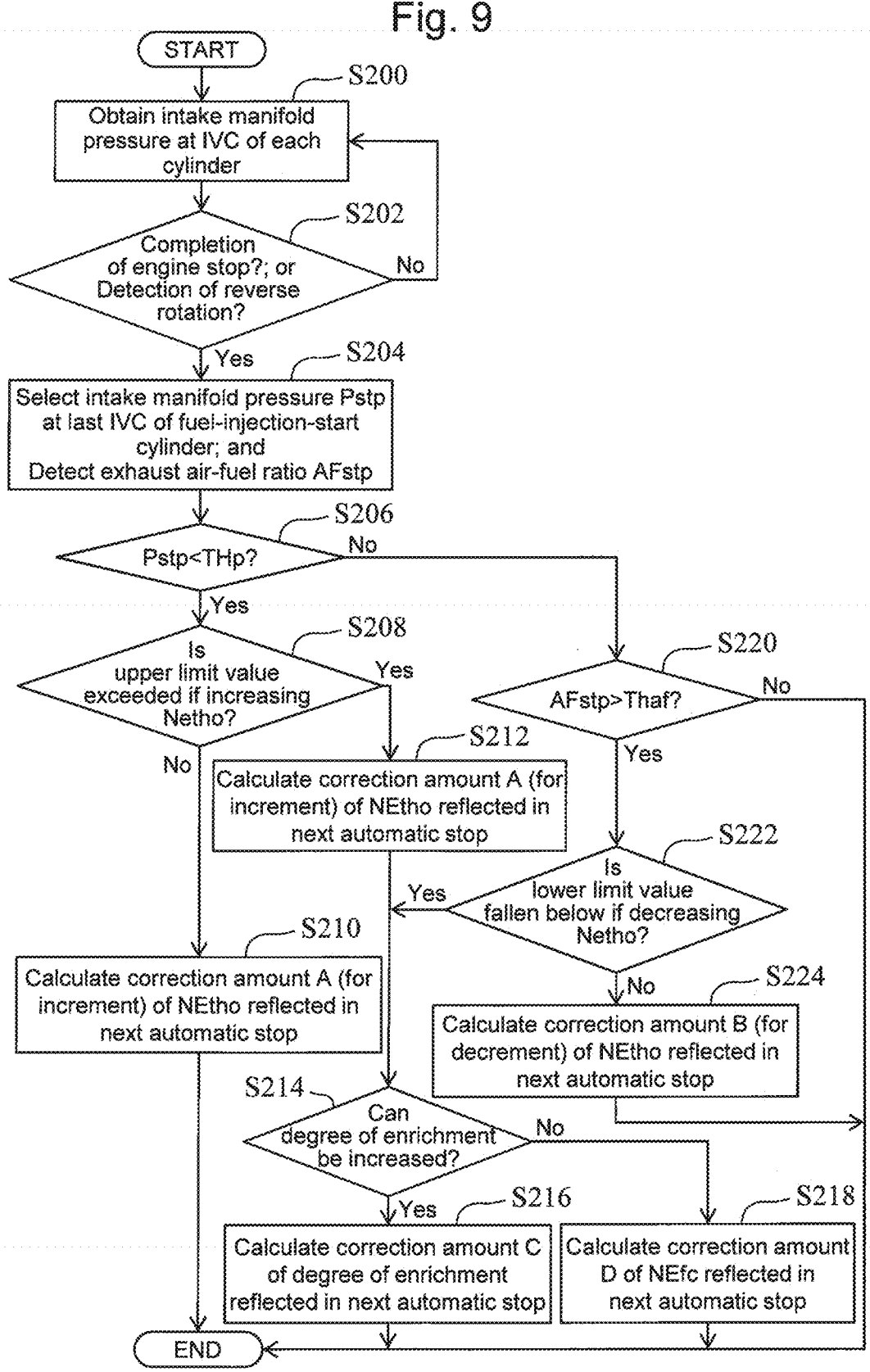
FIG. 9 is a flow chart that illustrates a subroutine of the processing (i.e., first correction processing) concerning a learning function of the throttle-opening engine speed NEtho in an automatic stop control according to a second embodiment of the present disclosure.

According to the subroutine shown in FIG. 9, firstly, the ECU 60 obtains, for each cylinder, the intake manifold pressure at a time point at which the closing timing IVC of the intake valve is reached in the course of the engine stop. In detail, obtaining the intake manifold pressure at the time point described above is performed as follows by the use of, for example, the crank angle sensor 54 and the intake air pressure sensor 44. That is to say, the value of the intake manifold pressure at the closing timing IVC in each cylinder in the course of the engine stop (i.e., course of rotation decrease) is latched in association with a crank angle counter. In addition, the intake manifold pressure may alternatively be obtained (estimated) by the use of a known model calculation.

(Step S202)

The ECU 60 executes a determination as to whether or not an engine stop has been completed and a determination as to whether or not a reverse rotation of the crankshaft 14 has been detected. The determination of this step S202 is performed in order to determine the fuel-injection-start cylinder (i.e., expansion stroke stop cylinder) in the ignition start-up control. It should be noted that, if the crankshaft 14 is reversely rotated before the completion of the engine stop, the crankshaft 14 is not further rotated in the positive direction thereafter. Because of this, the fuel-injection-start cylinder can be determined by the use of the crank angle sensor 54 at a time point of the completion of the engine stop or detection of the reverse rotation. If the determination result of this step S202 is negative, that is, if the fuel-injection-start cylinder has not yet been determined, the ECU 60 repeatedly executes the processing of step S200 to continue to obtain the intake manifold pressure. If, on the other hand, the determination result described above is positive, the processing proceeds to step S204.

(Step S204)

The ECU 60 selects, from the data of the intake manifold pressure obtained by the processing of step S200, the intake manifold pressure Pstp (i.e., the value of the intake manifold pressure at a time point (IVC time point) at which the last intake stroke of the fuel-injection-start cylinder that has been determined via the processing of step S202) is completed in the course of the engine stop.

In further addition to the above, the time point (IVC time point) at which the last intake stroke of the fuel-injection-start cylinder is completed can be grasped as follows. That is to say, when the V-type six-cylinder internal combustion engine 10 is taken as an example, there is a knowledge that the expansion stroke stop cylinder that is the fuel-injection-start cylinder stops roughly near 60 degrees CA after compression top dead center. Also, the closing timing IVC of the intake valve is a known value (for example, 100 degrees CA before compression top dead center). Thus, in this example, a timing of reaching a crank angle position that is advanced by 160 degrees CA (=60 degrees CA+100 degrees CA (which are mentioned above)) relative to a stop position (piston stop position) of the expansion stroke stop cylinder corresponds to a completion time point of the last intake stroke of the expansion stroke stop cylinder. Therefore, a desired intake manifold pressure Pstp can be obtained by retrieving a value of the intake manifold pressure associated with a crank counter value that is obtained backward from, by the crank angle width (160 degrees CA) calculated as described above, the value of the crank angle counter associated with the stopping position of the expansion stroke stop cylinder.

It should be noted that, when the V-type six-cylinder internal combustion engine 10 is taken as an example, there is a knowledge that the compression stroke stop cylinder stops roughly near 60 degrees CA before compression top dead center. Thus, if the fuel-injection-start cylinder is the compression stroke stop cylinder similarly to the example of the one-TDC start-up control, a timing of reaching a crank angle position that is advanced by 40 degrees CA (=100 degrees CA−60 degrees CA (which are mentioned above)) relative to a stop position of the compression stroke stop cylinder corresponds to a completion time point of the last intake stroke of the compression stroke stop cylinder. Therefore, a desired intake manifold pressure Pstp can be similarly obtained in the example in which the compression stroke stop cylinder is the fuel-injection-start cylinder. In addition, in internal combustion engines having any other number and arrangement of cylinders other than V-type six-cylinder, similarly, there is a knowledge inherent to each of the internal combustion engines concerning the piston stop position.

Furthermore, in this step S204, the ECU 60 obtains the exhaust air-fuel ratio AFstp, that is, the value of the exhaust air-fuel ratio obtained when the engine stop is completed (for example, immediately after the engine stop is completed). The exhaust air-fuel ratio AFstp can be obtained by the use of, for example, the air-fuel ratio sensor 52 that is arranged upstream of the catalyst 50. It should be noted that, in an example in which an air-fuel ratio sensor is arranged inside the catalyst 50 or downstream thereof, the exhaust air-fuel ratio AFstp may be obtained by the use of the air-fuel ratio sensor, instead of this example. The processing proceeds to step S206 after the processing of step S204 is executed.

(Step S206)

The ECU 60 determines whether or not the intake manifold pressure Pstp selected in the processing of step S204 is higher than the threshold value THp described above. As a result, if the intake manifold pressure Pstp is lower than the threshold value THp (that is, if it can be judged that the automatic stop control that has been executed is not good), the processing proceeds to step S208. If, on the other hand, the intake manifold pressure Pstp is higher than or equal to the threshold value THp (that is, if it can be judged that the automatic stop control that has been executed is good), the processing proceeds to step S220.

(Step S208)

The ECU 60 determines whether or not, if the throttle-opening engine speed NEtho is increased, the throttle-opening engine speed NEtho exceeds an upper limit value. For example, the upper limit value used for this determination can be obtained as a Y coordinate value of a coordinate point having, as an X coordinate value, the value of the throttle-opening engine speed NEtho used for the current automatic stop control on the straight line (see FIG. 7) of the maximum engine speed NEmax2. If the determination result of this step S208 is positive, the processing proceeds to step S212. If, on the other hand, this determination result is negative, the processing proceeds to step S210.

(Steps S210 and S212)

The ECU 60 calculates and stores a correction amount A of the throttle-opening engine speed NEtho that is reflected in the next automatic stop control. The correction amount A is a fixed value as an example. The correction amount A is added, at the time of the next automatic stop control, to a correction amount Xnetho for correcting the throttle-opening engine speed NEtho (base value) calculated in step S116 of the main routine described above. As a result, the correction amount Xnetho used for the next automatic stop control is increased by adding the correction amount A to the previous value. Therefore, in an example in which the processing successively proceeds to step S210 or S212 each time when the automatic stop control is executed, the correction amount Xnetho is gradually increased by the correction amount A.

Additionally, in the example in which the base value of the throttle-opening engine speed NEtho is calculated in accordance with the fuel cut engine speed NEfc similarly to the example of the setting shown in FIG. 7, if, for example, the base value is constant between the current automatic stop control and the next automatic stop control, the throttle-opening engine speed NEtho to be used for the next automatic stop control is corrected, according to the present correction, so as to be higher than a value of the current automatic stop control.

After the execution of the processing of step S210, the present subroutine is ended, and, on the other hand, after the execution of the processing of step S212, the processing proceeds to step S214.

(Step S214)

The ECU 60 determines whether or not the degree of enrichment of the air-fuel ratio by the air-fuel-ratio rich processing can be increased. In more detail, it is determined whether or not, if the degree of enrichment of the air-fuel ratio is further increased, the degree of enrichment will exceed the above-described limitation that is defined in view of the reduction of the exhaust emission. As a result, if the degree of enrichment of the air-fuel ratio can be increased, the processing proceeds to step S216. If, on the other hand, the degree of enrichment of the air-fuel ratio cannot be increased, the processing proceeds to step S218.

(Step S216)

The ECU 60 calculates and stores a correction amount C of the target air-fuel-ratio that is reflected in the air-fuel-ratio rich processing in the next automatic stop control. The correction amount C is a fixed value as an example. According to this correction, the target air-fuel-ratio used for the next automatic stop control has a value lower (i.e., richer) than its previous value by the correction amount C. After the execution of the processing of step S216, the present subroutine is ended.

(Step S218)

The ECU 60 calculates and stores a correction amount D of the fuel cut engine speed NEfc that is reflected in the next automatic stop control. This correction is performed prior to the execution of the fuel cut by the processing of step S112 at the time of the next automatic stop control. The correction amount D is a fixed value as an example. According to this correction, the fuel cut engine speed NEfc used for the next automatic stop control is corrected so as to have a value lower by the correction amount D within a predetermined correction available range. After the execution of the processing of step S218, the present subroutine is ended.
(Step S220)
The ECU 60 determines whether or not the exhaust air-fuel-ratio AFstp detected in the processing of step S204 is higher than the threshold value THaf described above. As a result, if exhaust air-fuel-ratio AFstp is higher than the threshold value THaf (that is, if it can be judged that the automatic stop control that has been executed is not good), the processing proceeds to step S222. If, on the other hand, the exhaust air-fuel-ratio AFstp is lower than or equal to the threshold value THaf (that is, it can be judged that the automatic stop control that has been executed is good), the present subroutine is ended.
(Step S222)
The ECU 60 determines whether or not, if the throttle-opening engine speed NEtho is decreased, the throttle-opening engine speed NEtho falls below a lower limit value. The example of the lower limit value used for this determination is the minimum engine speed NEmin. If the determination result of this step S222 is positive, the processing proceeds to step S214. If, on the other hand, this determination result is negative, the processing proceeds to step S224.
(Step S224)
The ECU 60 calculates and stores a correction amount B of the throttle-opening engine speed NEtho that is reflected in the next automatic stop control. The correction amount B is a fixed value as an example. According to this correction, the correction amount Xnetho used for correcting the base value of the throttle-opening engine speed NEtho at the time of the next automatic stop control is decreased by the correction amount B. Thus, in an example in which the processing continuously proceeds to step S224 each time when the automatic stop control is executed, the correction amount Xnetho is gradually decreased by the correction amount B. After the execution of the processing of step S224, the present subroutine is ended.

2-3. Advantageous Effects Concerning Engine Control According to Second Embodiment According to the automatic stop control of the present embodiment described so far, if the intake manifold pressure Pstp is lower than the threshold value THp, the throttle-opening engine speed NEtho used for the next or subsequent automatic stop control is increased. As a result, if a proper intake manifold pressure Pstp is not obtained due to the effects of the variation factors described above, the throttle-opening engine speed NEtho can be corrected such that the intake manifold pressure Pstp becomes proper. In other words, even if there are the effects of these variation factors, a decrease of the restartability due to the air charging demand being not meet can be reduced.

Moreover, according to the automatic stop control of the present embodiment, if the exhaust air-fuel-ratio is higher than the threshold value THaf, the throttle-opening engine speed NEtho used for the next or subsequent automatic stop control is decreased, provided that the throttle-opening engine speed NEtho does not falls below the lower limit value. As a result, when a proper exhaust air-fuel-ratio AFstp is not obtained due to the effects of the variation factors described above, the throttle-opening engine speed NEtho can be corrected such that the exhaust air-fuel-ratio AFstp becomes proper. In other words, even if there are the effects of these variation factors, a drop of the exhaust emission performance due to the demand of reduction of the phenomenon of making lean the atmosphere of the catalyst being not meet can be reduced.

As described so far, according to the automatic stop control of the present embodiment that includes the learning function described above, the effects of various factors described above can be reduced. Because of this, a good balance between achievement of a good restartability and reduction of the exhaust emission can be maintained longer and more stably as compared to an example without this kind of learning function.

Furthermore, according to the automatic stop control of the present embodiment, when, if the throttle-opening engine speed NEtho is increased, the throttle-opening engine speed NEtho exceeds the upper limit value (i.e., maximum engine speed NEmax2), the additional countermeasure described above (i.e., an increase of the degree of the enrichment of the air-fuel-ratio, or a decrease of the fuel cut engine speed NEfc) is executed. This kind of additional countermeasure is executed also when, if the throttle-opening engine speed NEtho is decreased, the throttle-opening engine speed NEtho falls below the lower limit value (i.e., minimum engine speed NEmin). Even if the throttle-opening engine speed NEtho exceeds the upper limit value or falls below the lower limit value, this kind of additional countermeasure can achieve the automatic stop control that can long and more stably maintain a good balance between achievement of a good restartability and reduction of the exhaust emission.

Additionally, according to the additional countermeasure described above, if the throttle-opening engine speed NEtho exceeds the upper limit value or falls below the lower limit value, an increase of the degree of enrichment of the air-fuel-ratio is executed preferentially as compared to a decrease of the fuel cut engine speed NEfc. This reasons is as follows. That is to say, a decrease of the fuel cut engine speed NEfc may lead to an increase of the duration of execution of the fuel-cut engine-speed correction processing that may be performed prior to the fuel cut for the intermittent stop. Because of this, there is a possibility that a decrease of the fuel cut engine speed NEfc may be accompanied by a decrease of fuel efficiency or a possibility that a feeling of strangeness due to the execution of the fuel cut for decreasing the fuel cut engine speed NEfc may be brought to the driver. Therefore, an increase of the degree of enrichment of the air-fuel-ratio is given priority.

2-4. Modification Examples Concerning Second Embodiment

The processing concerning the learning function according to the second embodiment described above (i.e., first correction processing) is executed each time when the automatic stop control is executed, provided that the result of the determination based on the intake manifold pressure Pstp or the exhaust air-fuel-ratio AFstp is positive. However, instead of this kind of example, the first correction processing may be executed, for example, each time when a predetermined time period that is longer than a time period in which multiple intermittent stops (automatic stop control) are expected to be executed elapses.

Furthermore, the correction of the throttle-opening engine speed NEtho by the first correction processing may alternatively be executed on the basis of only any one of the intake manifold pressure Pstp and the exhaust air-fuel-ratio AFstp, contrary to the second embodiment described above.

Third Embodiment

Next, a third embodiment according to the present disclosure will be described with reference to FIGS. 10 to 13.

3. Engine Control According to Third Embodiment

The engine control according to the present embodiment is different from the engine control according to the first embodiment in terms of a correction function of the throttle-opening engine speed NEtho described below is added to the automatic stop control described in the first embodiment.

3-1. Outline of Automatic Stop Control Having Correction Function of NEtho

The value of throttle-opening engine speed NEtho that is suitable for satisfying both the air charging demand and the demand of reduction of the phenomenon of making lean the atmosphere of the catalyst may change not only due to the variation factors as described in the first and second embodiments but also due to the following factor. That is to say, even if an internal combustion engine having the same specifications is used under the same environment, the friction of the internal combustion engine may variate in association with, for example, a variation of the way of temperature change of the engine oil in the course of an engine warm-up.

Figure 10:
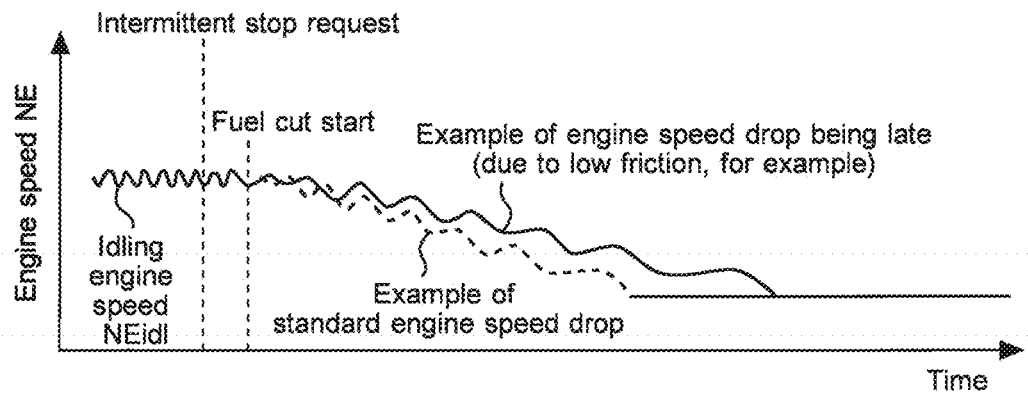
FIG. 10 is a time chart that illustrates an example of a change of the speed of engine-speed drop due to variation of friction of an internal combustion engine.

FIG. 10 is a time chart that illustrates an example of a change of the speed of engine-speed drop due to the variation of the friction of an internal combustion engine. The waveform shown by the broken line in FIG. 10 represents an example of a standard (i.e., reference) engine speed drop. On the other hand, the waveform shown by the solid line represents an example in which the drop speed of the engine speed NE (hereunder, also referred to as a "speed of engine-speed drop") is later than the example of the standard engine speed drop, due to a reason, such as low friction. As just described, if, for example, the friction changes, the speed of engine-speed drop as a result of the fuel cut for the intermittent stop may change.

If the speed of engine-speed drop is lower than the standard value (broken line) similarly to the example of the solid line shown in FIG. 10, the time period in which the internal combustion engine rotates in the course of the engine stop after the fuel cut becomes longer. Thus, in order to reduce the phenomenon of making lean the atmosphere of the catalyst, it is required to set the throttle-opening engine speed NEtho to be low. On the other hand, contrary to this example, if the speed of engine-speed drop is higher than the standard value, it is required to set the throttle-opening engine speed NEtho to be higher, in order to prevent the air charging demand for a cylinder destined to be the fuel-injection-start cylinder later from stopping being met.

As described so far, even if an internal combustion engine having the same specifications is used under the same environment, the throttle-opening engine speed NEtho that is suitable for satisfying both the above-described two demands may change due to such a factor (for example, change of the friction described above) that makes variable the speed of engine-speed drop in each automatic stop control.

Figure 11:
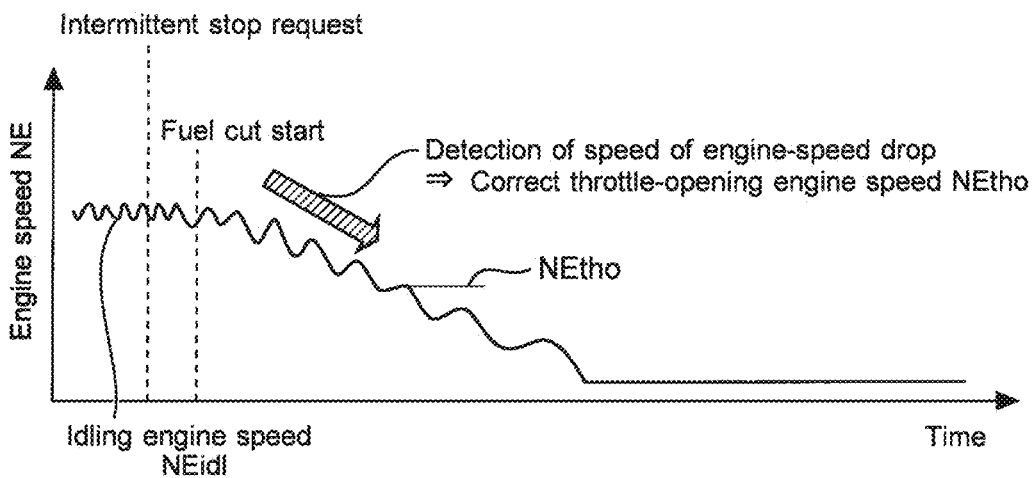
FIG. 11 is a time chart for describing a timing of execution of a correction processing of the throttle-opening engine speed NEtho according to a third embodiment of the present disclosure.

FIG. 11 is a time chart for describing a timing of execution of the correction processing of the throttle-opening engine speed NEtho according to the third embodiment of the present disclosure. It should be noted that this correction processing corresponds to an example of the "second correction processing" according to the present disclosure. According to the present embodiment, as shown in FIG. 11, the speed of engine-speed drop is detected at the initial stage of the course of the engine stop (i.e., course of the engine-speed drop) after the fuel cut. Also, according to the present embodiment, correction of the throttle-opening engine speed NEtho used for the course of the engine stop associated with the execution of this fuel cut (i.e., the course of the engine stop in which detection of the speed of engine-speed drop has been performed) is executed on the basis of the detected speed of engine-speed drop. To be more specific, the initial stage of the course of the engine stop mentioned here refers to a time period capable of correcting the throttle-opening engine speed NEtho on the basis of the detection result of the speed of engine-speed drop (in other words, time period before an arrival of the upper limit value of the throttle-opening engine speed NEtho that may be used).

Figure 12:
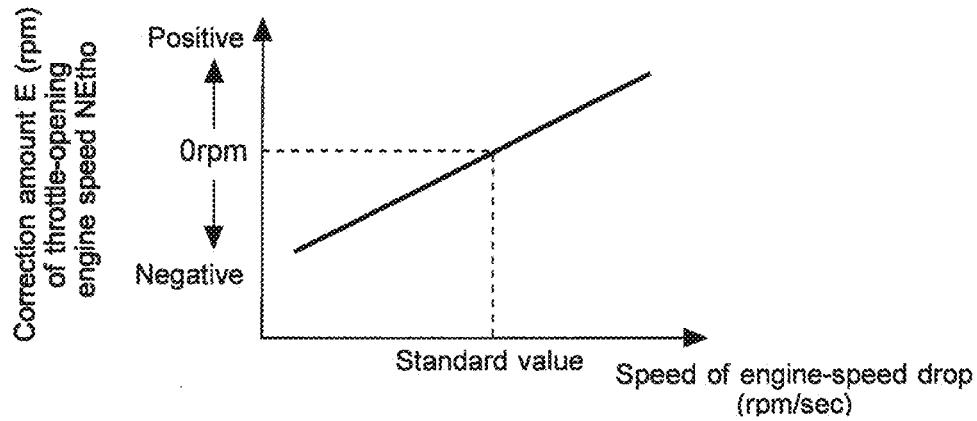
FIG. 12 is a graph for describing an example of a correction manner of the throttle-opening engine speed NEtho according to the speed of engine-speed drop.

FIG. 12 is a graph for describing an example of the correction manner of the throttle-opening engine speed NEtho according to the speed of engine-speed drop. The vertical axis of FIG. 12 represents a correction amount E of the throttle-opening engine speed NEtho according to the speed of engine-speed drop. As shown in FIG. 12, the correction amount E is made zero when the speed of engine-speed drop is the standard value.

Moreover, if the speed of engine-speed drop is lower than the standard value, a negative correction value E is used, and the throttle-opening engine speed NEtho is thus corrected so as to be lower. In more detail, the correction amount E is made greater on the negative side when the amount of decrease of the speed of engine-speed drop with respect to the standard value is greater.

If, on the other hand, the speed of engine-speed drop is higher than the standard value, a positive correction value E is used, and the throttle-opening engine speed NEtho is thus corrected so as to be higher. In more detail, the correction amount E is made greater on the positive side when the amount of increase of the speed of engine-speed drop with respect to the standard value is greater.

Figure 13:
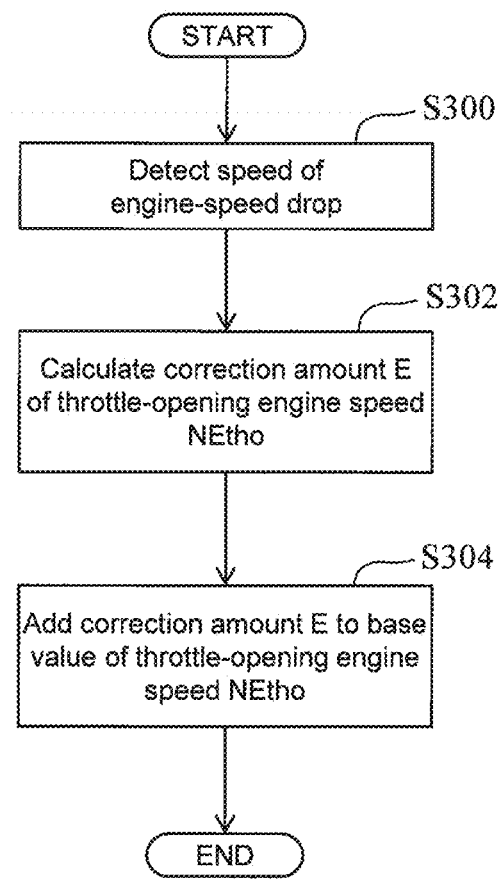
FIG. 13 is a flow chart that illustrates a subroutine of the processing (i.e., second correction processing) concerning a correction function of the throttle-opening engine speed NEtho in an automatic stop control according to the third embodiment of the present disclosure.

3-2. Processing of ECU Concerning Correction Function of NEtho in Automatic Stop Control FIG. 13 is a flow chart that illustrates a subroutine of the processing (i.e., second correction processing) concerning the correction function of the throttle-opening engine speed NEtho in the automatic stop control according to the third embodiment of the present disclosure. According to the present embodiment, the subroutine shown in FIG. 13 is executed in addition to a main routine that is the same as the routine shown in FIG. 8 described in the first embodiment. This subroutine is executed after the processing of step S116 of the main routine.

(Step S300)

According to the subroutine shown in FIG. 13, firstly, the ECU 60 detects the speed of engine-speed drop. Detection of the speed of engine-speed drop is executed at the initial stage of the course of the engine stop after the fuel cut as shown in FIG. 11. Thereafter, the processing proceeds to step S302.

(Step S302)

The ECU 60 calculates the above-described correction amount E of the throttle-opening engine speed NEtho. In the ECU 60, a map that defines a relationship between the speed of engine-speed drop and the correction amount E as shown in FIG. 12 is stored. The ECU 60 calculates, from this kind of map, the correction amount E according to the speed of engine-speed drop detected by the processing of step S300. Thereafter, the processing proceeds to step S304.
(Step S304)

The ECU 60 adds, to the throttle-opening engine speed NEtho (base value) that is calculated by the processing of step S116 of the main routine, the correction amount E that is calculated by the processing of step S302. As a result, except for an example of the correction amount E being zero, the correction amount E is reflected in the throttle-opening engine speed NEtho used for the current automatic stop control.

3-3. Advantageous Effects Concerning Engine Control According to Third Embodiment According to the automatic stop control of the present embodiment described so far, the throttle-opening engine speed NEtho used in the course of the engine stop after the fuel cut is corrected as described above in accordance with the correction amount E depending on the speed of engine-speed drop in this course of the engine stop. As a result, even if the throttle-opening engine speed NEtho that is suitable for satisfying both the above-described two demands variates due to a factor as exemplified in FIG. 10, a proper throttle-opening engine speed NEtho can be used stably. Therefore, a good balance between achievement of a good restartability and reduction of the exhaust emission can be maintained more stably as compared to an example without this kind of correction function.

It should be noted that the processing (i.e., second correction processing) concerning the correction function of the throttle-opening engine speed NEtho according to the third embodiment described above may alternatively be executed in combination with the processing (i.e., first correction processing) concerning the learning function according to the second embodiment described above.

Other Embodiments

4. Another Example of Vehicle System

The first to third embodiments have described the example of the system of the vehicle 1 that is a hybrid vehicle which includes the electric motor 12 in addition to the internal combustion engine 10 as its power sources and is configured to be able to execute the automatic stop control and the automatic start-up control. However, the vehicle system applicable to the present disclosure may be, for example, a vehicle system that includes only the internal combustion engine 10 as its power source and is configured to be able to execute an S&S (Stop & Start) control (also called an idling stop control).

The embodiments and modification examples described above may be combined in other ways than those explicitly described above as required and may be modified in various ways without departing from the scope of the present disclosure.

What is claimed is:
1. A control device for an internal combustion engine, the internal combustion engine including:
a fuel injection valve configured to directly inject fuel into a cylinder;
an ignition device configured to ignite an air-fuel mixture of the fuel and air; and
a throttle valve arranged in an intake air passage, the control device being configured to:
execute an automatic stop control that performs a fuel cut during operation of a vehicle system on which the internal combustion engine is mounted to intermittently stop the internal combustion engine; and
execute an automatic start-up control that performs a restart of the internal combustion engine that has been stopped by the automatic stop control,
the control device being configured, in the automatic start-up control, to commence the restart by starting fuel injection from a fuel-injection-start cylinder that is a cylinder in which a piston is in an expansion stroke or a compression stroke during an engine stop,
the control device being configured, in the automatic stop control, to:
execute an air-fuel-ratio rich processing that controls an air-fuel ratio such that the air-fuel ratio becomes richer than a stoichiometric air-fuel ratio before a start of the fuel cut;
execute a throttle closing processing that closes the throttle valve in synchronization with the fuel cut; and
execute a throttle opening processing that opens the throttle valve such that a throttle-downstream pressure that is a pressure at a portion of the intake-air passage located on a downstream side of the throttle valve approaches an atmospheric air pressure before a cylinder destined to be the fuel-injection-start cylinder later completes a last intake stroke in a course of the engine stop after execution of the throttle closing processing.
2. The control device according to claim 1,
wherein the control device is configured to execute a first correction processing that corrects a throttle-opening engine speed that is an engine speed at which the throttle valve starts to open by the throttle opening processing, and
wherein the control device is configured, in the first correction processing, to correct the throttle-opening engine speed used for a next or subsequent automatic stop control, based on at least one of a specified throttle-downstream pressure and a specified exhaust air-fuel ratio, the specified throttle-downstream pressure being the throttle-downstream pressure present when the cylinder destined to be the fuel-injection-start cylinder later completes the last intake stroke in the course of the engine stop, the specified exhaust air-fuel ratio being an air-fuel ratio of exhaust gas present when the engine stop by the automatic stop control is completed.
3. The control device according to claim 2,
wherein the control device is configured, in the first correction processing, to increase the throttle-opening engine speed when the specified throttle-downstream pressure is lower than a pressure threshold value.
4. The control device according to claim 3,
wherein the control device is configured, in the first correction processing, to increase a degree of enrichment of the air-fuel ratio by the air-fuel-ratio rich processing in addition to an increase of the throttle-opening engine speed when, if the throttle-opening engine speed is increased, the throttle-opening engine speed exceeds an upper limit value.
5. The control device according to claim 4,
wherein, in the first correction processing, the control device is configured, where the degree of enrichment is not able to be increased due to a limitation when, if the throttle-opening engine speed is increased, the throttle- opening engine speed exceeds the upper limit value, to decrease a fuel cut engine speed that is an engine speed at the start of the fuel cut, instead of an increase of the degree of enrichment, in addition to the increase of the throttle-opening engine speed.

6. The control device according to claim 2,
wherein the control device is configured, in the first correction processing, to decrease the throttle-opening engine speed when the specified exhaust air-fuel ratio is higher than an air-fuel-ratio threshold value.

7. The control device according to claim 6,
wherein, in the first correction processing, the control device is configured, when, if the throttle-opening engine speed is decreased, the throttle-opening engine speed falls below a lower limit value, to increase a degree of enrichment of the air-fuel ratio by the air-fuel-ratio rich processing without decreasing the throttle-opening engine speed.

8. The control device according to claim 7,
wherein, in the first correction processing, the control device is configured, where the degree of enrichment is not able to be increased due to a limitation when, if the throttle-opening engine speed is decreased, the throttle-opening engine speed falls below the lower limit value, to decrease a fuel cut engine speed that is an engine speed at the start of the fuel cut, instead of an increase of the degree of enrichment, without decreasing the throttle-opening engine speed.

9. The control device according to claim 1,
wherein the control device is configured to execute a second correction processing that corrects a throttle-opening engine speed that is an engine speed at which the throttle valve starts to open by the throttle opening processing, and
wherein the control device is configured, in the second correction processing, to correct the throttle-opening engine speed used for the course of the engine stop associated with execution of the fuel cut, based on a speed of the engine-speed drop after the start of the fuel cut.

10. The control device according to claim 1,
wherein the control device is configured to retard a spark timing in synchronization with the air-fuel-ratio rich processing.

11. The control device according to claim 1,
wherein the control device is configured, where an engine speed is higher than an engine speed threshold value when a request to execute the automatic stop control is made, to execute a fuel-cut engine-speed correction processing that performs the fuel cut after causing the engine speed to be lower than or equal to the engine speed threshold value.

12. The control device according to claim 1,
wherein the control device is configured, when a fuel cut engine speed that is an engine speed at the start of the fuel cut is higher within a high fuel-cut engine-speed range in which the fuel cut engine speed is high, to lower a throttle-opening engine speed that is an engine speed at which the throttle valve starts to open by the throttle opening processing, as compared to when the fuel cut engine speed is lower in the high fuel-cut engine speed range.

13. The control device according to claim 1,
wherein the control device is configured, in receiving a request to restart the internal combustion engine during the throttle valve being closed by the throttle closing processing in the course of the engine stop, to discontinue the automatic stop control and execute a second restart control that is different from the automatic start-up control, and
wherein, in the second restart control, the control device is configured, in the course of the engine stop after discontinuing the automatic stop control, to open the throttle valve and then restart the fuel injection.

* * * * *

UNITED STATES PATENT AND TRADEMARK OFFICE
CERTIFICATE OF CORRECTION

PATENT NO. : 10,662,885 B2
APPLICATION NO. : 16/224696
DATED : May 26, 2020
INVENTOR(S) : Yusuke Suzuki and Kunihiko Usui Page 1 of 1

It is certified that error appears in the above-identified patent and that said Letters Patent is hereby corrected as shown below:

In the Claims

Column 32, Line 55, change "4. The control device according to claim 3," to --4. The control device according to claim 2,--

Column 32, Line 63, change "5. The control device according to claim 4," to --5. The control device according to claim 3,--

Column 33, Line 6, change "6. The control device according to claim 2," to --6. The control device according to claim 5,--

Column 33, Line 12, change "7. The control device according to claim 6," to --7. The control device according to claim 4,--

Signed and Sealed this
Eighteenth Day of August, 2020

Andrei Iancu
*Director of the United States Patent and Trademark Office*